United States Patent
Stockhammer et al.

(10) Patent No.: US 11,638,062 B2
(45) Date of Patent: *Apr. 25, 2023

(54) TIME SIGNALING FOR MEDIA STREAMING

(71) Applicant: QUALCOMM Incorporated, San Diego, CA (US)

(72) Inventors: Thomas Stockhammer, Bergen (DE); Waqar Zia, Munich (DE)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/211,554

(22) Filed: Mar. 24, 2021

(65) Prior Publication Data

US 2021/0211766 A1    Jul. 8, 2021

Related U.S. Application Data

(63) Continuation of application No. 16/505,598, filed on Jul. 8, 2019, now Pat. No. 10,986,402.

(Continued)

(51) Int. Cl.
*H04N 1/00*  (2006.01)
*H04N 21/4402*  (2011.01)
(Continued)

(52) U.S. Cl.
CPC ....... *H04N 21/4402* (2013.01); *H04N 21/435* (2013.01); *H04N 21/8456* (2013.01)

(58) Field of Classification Search
USPC ........ 386/278, 280, 282, 283, 291, 326, 353
See application file for complete search history.

(56) References Cited

U.S. PATENT DOCUMENTS 9,786,255 B2    10/2017  Verbeure et al.
2006/0008250 A1*  1/2006  Wang ................. G11B 19/047
                                                          386/E5.064

(Continued)

FOREIGN PATENT DOCUMENTS

CN      1729689 A    2/2006
CN    101536105 A    9/2009
(Continued)

OTHER PUBLICATIONS

International Search Report and Written Opinion—PCT/US2019/041079—ISA/EPO—dated Sep. 19, 2019.

(Continued)

*Primary Examiner* — Daquan Zhao
(74) *Attorney, Agent, or Firm* — Campbell C. Chiang

(57) ABSTRACT

Systems and techniques are described for processing media content, such as samples of sparse media content whose sample durations can be unknown at the time of decoding the samples, include obtaining, at a current time instance, a current fragment comprising at least a current time component. From the current time component, a modified duration is obtained for at least one media sample, the modified duration indicating a time duration by which a presentation of a previous media sample of a previous fragment is to be extended or reduced in relation to the current time instance. The at least one media sample is presented for a time duration based on the modified duration.

70 Claims, 14 Drawing Sheets

Related U.S. Application Data

(60) Provisional application No. 62/696,547, filed on Jul. 11, 2018.

(51) Int. Cl.
  *H04N 21/435*   (2011.01)
  *H04N 21/845*   (2011.01)
  *H04N 9/00*   (2006.01)
  *H04N 7/00*   (2011.01)

(56) References Cited

U.S. PATENT DOCUMENTS

| | | | |
|---|---|---|---|
| 2006/0098960 A1* | 5/2006 | Okayama | G11B 27/105 |
| 2010/0135637 A1 | 6/2010 | McDermott et al. | |
| 2011/0292068 A1 | 12/2011 | Kobayashi | |
| 2015/0195327 A1 | 7/2015 | Bouazizi et al. | |
| 2016/0014480 A1 | 1/2016 | Maze et al. | |
| 2016/0373771 A1 | 12/2016 | Hendry et al. | |
| 2017/0171577 A1 | 6/2017 | Kipp | |
| 2017/0339437 A1 | 11/2017 | Lee et al. | |
| 2018/0103271 A1 | 4/2018 | Wang et al. | |
| 2019/0349629 A1 | 11/2019 | Stockhammer | |
| 2020/0021883 A1* | 1/2020 | Stockhammer | H04N 21/26258 |
| 2021/0084368 A1 | 3/2021 | Dabbiru et al. | |

FOREIGN PATENT DOCUMENTS

| | | |
|---|---|---|
| CN | 101669369 A | 3/2010 |
| CN | 104040993 A | 9/2014 |
| CN | 106134208 A | 11/2016 |
| CN | 107077873 A | 8/2017 |
| EP | 1765017 A1 | 3/2007 |

OTHER PUBLICATIONS

"Text of ISO/IEC 14496-12 5th Edition" 111, MPEG Meeting; Jun. 2, 2015-Feb. 20, 2015; Geneva; (Motion Picture Expert Group or ISO/IEC JTC1/SC29/WG11) No. N15177, Apr. 13, 2015 (Apr. 13, 2015), pp. 293, XP030021903, Section 10.6 Stream access point sample Group, p. 62, paragraph 8.8.12.1, p. 42, paragraph 8.6 .4.3.

* cited by examiner

TIME SIGNALING FOR MEDIA STREAMING

CROSS-REFERENCE TO RELATED APPLICATIONS

This application is a continuation of Ser. No. 16/505,598, filed Jul. 8, 2019, which claims the benefit of U.S. Provisional Application No. 62/696,547, filed Jul. 11, 2018, both of which are hereby incorporated by reference, in their entirety and for all purposes.

FIELD

This application is related to systems and methods for media streaming. For example, aspects of this disclosure are directed to time signaling for media streaming.

BACKGROUND

Many devices and systems allow media data to be processed and output for consumption. The media data can include video data and/or audio data. For example, digital video data can include large amounts of data to meet the demands of consumers and video providers. For example, consumers of video data desire video of the utmost quality, with high fidelity, resolutions, frame rates, and the like. As a result, the large amount of video data that is required to meet these demands places a burden on communication networks and devices that process and store the video data.

Various video coding techniques may be used to compress video data. Video coding is performed according to one or more video coding standards. For example, video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 or ISO/IEC MPEG-4 AVC, including its Scalable Video Coding (SVC) and Multiview Video Coding (MVC) extensions, and High-Efficiency Video Coding (HEVC), also known as ITU-T H.265 and ISO/IEC 23008-2, including its scalable coding extension (i.e., scalable high-efficiency video coding, SHVC) and multiview extension (i.e., multiview high efficiency video coding, MV-HEVC). Video coding generally utilizes prediction methods (e.g., inter-prediction, intra-prediction, or the like) that take advantage of redundancy present in video images or sequences. An important goal of video coding techniques is to compress video data into a form that uses a lower bitrate, while avoiding or minimizing degradations to video quality.

After video data has been encoded, the video data may be packetized for transmission or storage. The video data may be assembled into a video file conforming to any of a variety of standards, such as the International Organization for Standardization (ISO) base media file format and extensions thereof, such as ITU-T H.264/AVC. Such packetized video data may be transported in a variety of ways, such as transmission over a computer network using network streaming.

SUMMARY

Techniques and systems are described herein for providing time signaling for media streaming, such as low-latency media streaming or other media streaming. For example, the techniques and systems can present samples (e.g., samples of sparse media content or other media content) whose sample durations can be unknown at the time of decoding the samples. According to some examples, the sample duration of a previous sample can be extended or reduced based on an indication or signaling provided in a current sample. The current sample can include a sample currently being processed, and the previous sample can include a sample received, decoded, and/or rendered prior to the current sample. In some examples, the previous sample can include sparse content of unknown duration. For instance, the previous sample can be a media frame (e.g., a video frame) containing a subtitle or other sparse media content that has an unknown duration. A previous fragment which included the previous sample can include the sample duration of the previous sample, where the sample duration was set to a reasonable estimate.

Upon decoding the current sample, a modified duration can be obtained, which can include the signaling for extending or reducing the sample duration of the previous sample. For example, if a current fragment which includes the current sample is decoded at a current time instance, the modified duration can be obtained from the current fragment. The modified duration can indicate a time duration by which the presentation of the previous sample is to be extended or reduced in relation to the current time instance. At least one media sample can be presented by the player device for a time duration based on the modified duration. For example, presenting the at least one media sample can include presenting the previous media sample for an extended duration or presenting a new media sample starting at the current time instance. In some examples, presenting the at least one media sample can include reducing the sample duration for presenting the previous media sample.

According to at least one example, a method of processing media content is provided. The method can include obtaining, at a current time instance, a current fragment comprising at least a current time component. The method can further include determining, from the current time component, a modified duration for at least one media sample, the modified duration indicating a time duration by which a presentation of a previous media sample of a previous fragment is to be extended or reduced in relation to the current time instance. The method can further include presenting the at least one media sample for a time duration based on the modified duration.

In another example, an apparatus for processing media content is provided. The apparatus includes a memory and a processor implemented in circuitry. The apparatus is configured to and can obtain, at a current time instance, a current fragment comprising at least a current time component. The apparatus is further configured to and can determine, from the current time component, a modified duration for at least one media sample, the modified duration indicating a time duration by which a presentation of a previous media sample of a previous fragment is to be extended or reduced in relation to the current time instance. The apparatus is further configured to and can present the at least one media sample for a time duration based on the modified duration.

In another example, a non-transitory computer-readable medium is provided that has stored thereon instructions that, when executed by one or more processors, cause the one or more processor to obtain, at a current time instance, a current fragment comprising at least a current time component; determine, from the current time component, a modified duration for at least one media sample, the modified duration indicating a time duration by which a presentation of a previous media sample of a previous fragment is to be extended or reduced in relation to the current time instance;

and present the at least one media sample for a time duration based on the modified duration.

In another example, an apparatus for processing media content is provided. The apparatus includes means for obtaining, at a current time instance, a current fragment comprising at least a current time component; means for determining, from the current time component, a modified duration for at least one media sample, the modified duration indicating a time duration by which a presentation of a previous media sample of a previous fragment is to be extended or reduced in relation to the current time instance; and means for presenting the at least one media sample for a time duration based on the modified duration.

In some aspects of the methods, apparatuses, and computer-readable medium described above, the modified duration includes an extension duration, the extension duration indicating a time duration by which the presentation of the previous media sample is to be extended in relation to the current time instance.

In some aspects of the methods, apparatuses, and computer-readable medium described above, the modified duration includes a reduction duration, the reduction duration indicating a time duration by which the presentation of the previous media sample is to be reduced in relation to the current time instance.

In some aspects of the methods, apparatuses, and computer-readable medium described above, presenting the at least one media sample includes extending a duration of presentation of the previous media sample by at least the extension duration.

In some aspects of the methods, apparatuses, and computer-readable medium described above, presenting the at least one media sample includes presenting a new media sample at the current time instance for at least the extension duration.

In some aspects of the methods, apparatuses, and computer-readable medium described above, presenting the at least one media sample includes reducing a duration of presentation of the previous media sample by the reduction duration.

In some aspects of the methods, apparatuses, and computer-readable medium described above, the previous media sample is obtained at a previous time instance, the previous time instance preceding the current time instance.

In some aspects of the methods, apparatuses, and computer-readable medium described above, the current fragment is an empty fragment without media sample data. In some examples, the current fragment includes a redundant media sample, where the redundant media sample matches the previous media sample.

In some aspects of the methods, apparatuses, and computer-readable medium described above, the current fragment includes a redundant media sample field, the redundant media sample field for providing an indication of the redundant media sample.

In some aspects of the methods, apparatuses, and computer-readable medium described above, presenting the at least one media sample includes displaying video content of the at least one media sample.

In some aspects of the methods, apparatuses, and computer-readable medium described above, presenting the at least one media sample includes presenting audio content of the at least one media sample.

In some aspects of the methods, apparatuses, and computer-readable medium described above, obtaining the current fragment includes receiving and decoding the current fragment.

In some aspects of the methods, apparatuses, and computer-readable medium described above, the current fragment includes a Track Fragment Decode Time Box (tfdt) box, the tfdt box including the current time component.

In some aspects of the methods, apparatuses, and computer-readable medium described above, the current time component includes a baseMediaDecodeTime value.

In some aspects of the methods, apparatuses, and computer-readable medium described above, the previous fragment includes a sample duration for presenting the previous media sample, and the sample duration includes a predetermined reasonable duration.

In some aspects of the methods, apparatuses, and computer-readable medium described above, the at least one media sample includes sparse content, where a duration for presenting the sparse content is not known at a previous time instance when the previous fragment is decoded.

In some aspects of the methods, apparatuses, and computer-readable medium described above, the apparatus includes a decoder.

In some aspects of the methods, apparatuses, and computer-readable medium described above, the apparatus includes a player device for presenting the media content.

According to at least one example, a method of providing media content is provided. The method can include providing, at a previous time instance, a previous fragment comprising a previous media sample, wherein a time for presenting the previous media sample is unknown at the previous time instance. The method can further include providing, at a current time instance, a current fragment comprising at least a current time component, wherein the current time component includes a modified duration for the previous media sample, the modified duration indicating a time duration by which a presentation of the previous media sample is to be extended or reduced in relation to the current time instance.

In another example, an apparatus for providing media content is provided. The apparatus includes a memory and a processor implemented in circuitry. The processor is configured to and can provide, at a previous time instance, a previous fragment comprising a previous media sample, wherein a duration for presenting the previous media sample is unknown at the previous time instance. The processor is further configured to and can provide, at a current time instance, a current fragment comprising at least a current time component, wherein the current time component includes a modified duration for the previous media sample, the modified duration indicating a time duration by which a presentation of the previous media sample is to be extended or reduced in relation to the current time instance.

In another example, a non-transitory computer-readable medium is provided that has stored thereon instructions that, when executed by one or more processors, cause the one or more processors to provide, at a previous time instance, a previous fragment comprising a previous media sample, wherein a duration for presenting the previous media sample is unknown at the previous time instance; and provide, at a current time instance, a current fragment comprising at least a current time component, wherein the current time component includes a modified duration for the previous media sample, the modified duration indicating a time duration by which a presentation of the previous media sample is to be extended or reduced in relation to the current time instance.

In another example, an apparatus for providing media content is provided. The apparatus includes means for providing, at a previous time instance, a previous fragment comprising a previous media sample, wherein a duration for presenting the previous media sample is unknown at the previous time instance; and means for providing, at a current time instance, a current fragment comprising at least a current time component, wherein the current time component includes a modified duration for the previous media sample, the modified duration indicating a time duration by which a presentation of the previous media sample is to be extended or reduced in relation to the current time instance.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures.

DETAILED DESCRIPTION

Figure 1:
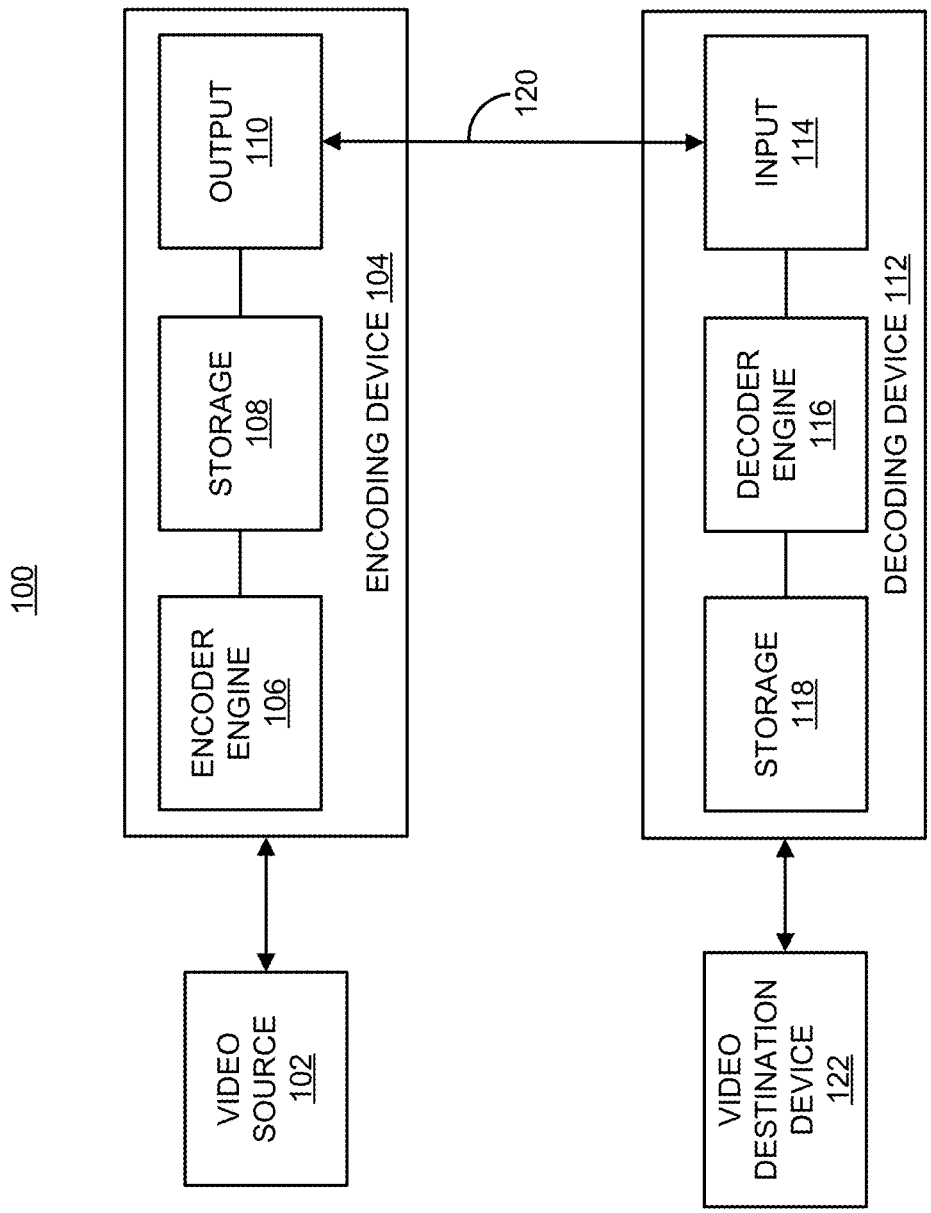
FIG. 1 is a block diagram illustrating an example of an encoding device and a decoding device, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Video coding devices implement video compression techniques to encode and decode video data efficiently. Video compression techniques may include applying different prediction modes, including spatial prediction (e.g., intra-frame prediction or intra-prediction), temporal prediction (e.g., inter-frame prediction or inter-prediction), inter-layer prediction (across different layers of video data, and/or other prediction techniques to reduce or remove redundancy inherent in video sequences. A video encoder can partition each picture of an original video sequence into rectangular regions referred to as video blocks or coding units (described in greater detail below). These video blocks may be encoded using a particular prediction mode.

Video blocks may be divided in one or more ways into one or more groups of smaller blocks. Blocks can include coding tree blocks, prediction blocks, transform blocks, and/or other suitable blocks. References generally to a "block," unless otherwise specified, may refer to such video blocks (e.g., coding tree blocks, coding blocks, prediction blocks, transform blocks, or other appropriate blocks or sub-blocks, as would be understood by one of ordinary skill). Further, each of these blocks may also interchangeably be referred to herein as "units" (e.g., coding tree unit (CTU), coding unit, prediction unit (PU), transform unit (TU), or the like). In some cases, a unit may indicate a coding logical unit that is encoded in a bitstream, while a block may indicate a portion of video frame buffer a process is target to.

For inter-prediction modes, a video encoder can search for a block similar to the block being encoded in a frame (or picture) located in another temporal location, referred to as a reference frame or a reference picture. The video encoder may restrict the search to a certain spatial displacement from the block to be encoded. A best match may be located using a two-dimensional (2D) motion vector that includes a horizontal displacement component and a vertical displacement component. For intra-prediction modes, a video encoder may form the predicted block using spatial prediction techniques based on data from previously encoded neighboring blocks within the same picture.

The video encoder may determine a prediction error. For example, the prediction can be determined as the difference between the image sample or pixel values in the block being encoded and the predicted block. The prediction error can also be referred to as the residual. The video encoder may also apply a transform to the prediction error (e.g., a discrete cosine transform (DCT) or other suitable transform) to generate transform coefficients. After transformation, the video encoder may quantize the transform coefficients. The quantized transform coefficients and motion vectors may be represented using syntax elements, and, along with control information, form a coded representation of a video sequence. In some instances, the video encoder may entropy code syntax elements, thereby further reducing the number of bits needed for their representation.

A video decoder may, using the syntax elements and control information discussed above, construct predictive data (e.g., a predictive block) for decoding a current frame. For example, the video decoder may add the predicted block and the compressed prediction error. The video decoder may determine the compressed prediction error by weighting the transform basis functions using the quantized coefficients. The difference between the reconstructed frame and the original frame is called reconstruction error.

The techniques described herein can be applied to any of the existing video codecs (e.g., High Efficiency Video Coding (HEVC), Advanced Video Coding (AVC), or other suitable existing video codec), and/or can be an efficient coding tool for any video coding standards being developed and/or future video coding standards, such as, for example, Versatile Video Coding (VVC), the joint exploration model (JEM), and/or other video coding standard in development or to be developed. While examples are provided herein using video coding for illustrative purposes, in some cases, the techniques described herein can be performed using any coding device, such as an image coder (e.g., a JPEG encoder and/or decoder, or the like), a video coder (e.g., a video encoder and/or video decoder), or other suitable coding device.

FIG. 1 is a block diagram illustrating an example of a system 100 including an encoding device 104 and a decoding device 112. The encoding device 104 may be part of a source device, and the decoding device 112 may be part of a receiving device. The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the source device and the receiving device may include one or more wireless transceivers for wireless communications. The coding techniques described herein are applicable to video coding in various multimedia applications, including streaming video transmissions (e.g., over the Internet), television broadcasts or transmissions, encoding of digital video for storage on a data storage medium, decoding of digital video stored on a data storage medium, or other applications. In some examples, system 100 can support one-way or two-way video transmission to support applications such as video conferencing, video streaming, video playback, video broadcasting, gaming, and/or video telephony.

The encoding device 104 (or encoder) can be used to encode video data using a video coding standard or protocol to generate an encoded video bitstream. Examples of video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), including its Scalable Video Coding (SVC) and Multiview Video Coding (MVC) extensions, and High Efficiency Video Coding (HEVC) or ITU-T H.265. Various extensions to HEVC deal with multi-layer video coding exist, including the range and screen content coding extensions, 3D video coding (3D-HEVC) and multiview extensions (MV-HEVC) and scalable extension (SHVC). The HEVC and its extensions have been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG).

MPEG and ITU-T VCEG have also formed a joint exploration video team (JVET) to explore and develop new video coding tools for the next generation of video coding standard, named Versatile Video Coding (VVC). The reference software is called VVC Test Model (VTM). An objective of VVC is to provide a significant improvement in compression performance over the existing HEVC standard, aiding in deployment of higher-quality video services and emerging applications (e.g., such as 360° omnidirectional immersive multimedia, high-dynamic-range (HDR) video, among others).

Many embodiments described herein provide examples using the VTM, VVC, HEVC, and/or extensions thereof. However, the techniques and systems described herein may also be applicable to other coding standards, such as AVC, MPEG, JPEG (or other coding standard for still images), extensions thereof, or other suitable coding standards already available or not yet available or developed. Accordingly, while the techniques and systems described herein may be described with reference to a particular video coding standard, one of ordinary skill in the art will appreciate that the description should not be interpreted to apply only to that particular standard.

Referring to FIG. 1, a video source 102 may provide the video data to the encoding device 104. The video source 102 may be part of the source device, or may be part of a device other than the source device. The video source 102 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 102 may include one or more input pictures. Pictures may also be referred to as "frames." A picture or frame is a still image that, in some cases, is part of a video. In some examples, data from the video source 102 can be a still image that is not a part of a video. In HEVC, VVC, and other video coding specifications, a video sequence can include a series of pictures. A picture may include three image sample arrays, denoted $S_L$, $S_{Cb}$, and $S_{Cr}$. $S_L$ is a two-dimensional array of luma image samples, $S_{Cb}$ is a two-dimensional array of Cb chrominance image samples, and $S_{Cr}$ is a two-dimensional array of Cr chrominance image samples. Chrominance image samples may also be referred to herein as "chroma" image samples. An image sample can refer to an individual component of a pixel (e.g., a luma sample, a chroma-blue sample, a chroma-red sample, a blue sample, a green sample, a red sample, or the like). A pixel can refer to all components (e.g., including luma and chroma image samples) for a given location (e.g., referred to as a pixel location) in an array of a picture. In other instances, a picture may be monochrome and may only include an array of luma image samples, in which case the terms pixel and image sample can be used interchangeably.

The encoder engine 106 (or encoder) of the encoding device 104 encodes the video data to generate an encoded video bitstream. In some examples, an encoded video bitstream (or "video bitstream" or "bitstream") is a series of one or more coded video sequences. A coded video sequence (CVS) includes a series of access units (AUs) starting with an AU that has a random access point picture in the base layer and with certain properties up to and not including a next AU that has a random access point picture in the base layer and with certain properties. For example, the certain properties of a random access point picture that starts a CVS may include a RASL flag (e.g., NoRaslOutputFlag) equal to 1. Otherwise, a random access point picture (with RASL flag equal to 0) does not start a CVS. An access unit (AU) includes one or more coded pictures and control information corresponding to the coded pictures that share the same output time. Coded slices of pictures are encapsulated in the bitstream level into data units called network abstraction layer (NAL) units. For example, an HEVC video bitstream may include one or more CVSs including NAL units. Each of the NAL units has a NAL unit header. In one example, the header is one-byte for H.264/AVC (except for multi-layer extensions) and two-byte for HEVC. The syntax elements in the NAL unit header take the designated bits and therefore are visible to all kinds of systems and transport layers, such as Transport Stream, Real-time Transport (RTP) Protocol, File Format, among others.

Two classes of NAL units exist in the HEVC standard, including video coding layer (VCL) NAL units and non-VCL NAL units. A VCL NAL unit includes one slice or slice segment (described below) of coded picture data, and a non-VCL NAL unit includes control information that relates to one or more coded pictures. In some cases, a NAL unit can be referred to as a packet. An HEVC AU includes VCL NAL units containing coded picture data and non-VCL NAL units (if any) corresponding to the coded picture data.

NAL units may contain a sequence of bits forming a coded representation of the video data (e.g., an encoded video bitstream, a CVS of a bitstream, or the like), such as coded representations of pictures in a video. The encoder engine 106 generates coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments.

In HEVC, the slices are then partitioned into coding tree blocks (CTBs) of luma image samples and chroma image samples. A CTB of luma image samples and one or more CTBs of chroma image samples, along with syntax for the image samples, are referred to as a coding tree unit (CTU). A CTU may also be referred to as a "tree block" or a "largest coding unit" (LCU). A CTU is the basic processing unit for HEVC encoding. A CTU can be split into multiple coding units (CUs) of varying sizes. A CU contains luma and chroma image sample arrays that are referred to as coding blocks (CBs).

The luma and chroma CBs can be further split into prediction blocks (PBs). A PB is a block of image samples of the luma component or a chroma component that uses the same motion parameters for inter-prediction or intra-block copy prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). A TB represents a square block of image samples of a color component on which the same two-dimensional transform is applied for coding a prediction residual signal. A transform unit (TU) represents the TBs of luma and chroma image samples, and corresponding syntax elements.

A size of a CU corresponds to a size of the coding mode and may be square in shape. For example, a size of a CU may be 8×8 samples, 16×16 samples, 32×32 samples, 64×64 samples, or any other appropriate size up to the size of the corresponding CTU. The phrase "N×N" is used herein to refer to image sample or pixel dimensions of a video block in terms of vertical and horizontal dimensions (e.g., 8 pixels×8 pixels or 8 samples×8 samples). The image samples or pixels in a block may be arranged in rows and columns. In some embodiments, blocks may not have the same number of image samples or pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to the HEVC standard, transformations may be performed using transform units (TUs). TUs may vary for different CUs. The TUs may be sized based on the size of PUs within a given CU. The TUs may be the same size or smaller than the PUs. In some examples, residual image samples corresponding to a CU may be subdivided into smaller units using a quadtree structure known as residual quad tree (RQT). Leaf nodes of the RQT may correspond to TUs. Pixel difference values (or image sample difference values) associated with the TUs may be transformed to produce transform coefficients. The transform coefficients may then be quantized by the encoder engine 106.

Once the pictures of the video data are partitioned into CUs, the encoder engine 106 predicts each PU using a prediction mode. The prediction unit or prediction block is then subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Intra-prediction utilizes the correlation between spatially neighboring image samples within a picture. For example, using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction may be made, for example, at the CU level.

The encoder engine 106 and decoder engine 116 (described in more detail below) may be configured to operate according to VVC. According to VVC, a video coder (such as encoder engine 106 and/or decoder engine 116) partitions a picture into a plurality of coding tree units (CTUs). The video coder can partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels, including a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree partition, a binary tree partition, and one or more types of triple tree partitions. A triple tree partition is a partition where a block is split into three sub-blocks. In some examples, a triple tree partition divides a block into three sub-blocks without dividing the original block through the center. The partitioning types in MTT (e.g., quadtree, binary tree, and tripe tree) may be symmetrical or asymmetrical.

In some examples, the video coder can use a single QTBT or MTT structure to represent each of the luminance and chrominance components, while in other examples, the video coder can use two or more QTBT or MTT structures, such as one QTBT or MTT structure for the luminance component and another QTBT or MTT structure for both chrominance components (or two QTBT and/or MTT structures for respective chrominance components).

In VVC, a picture can be partitioned into slices, tiles, and bricks. In general, a brick can be a rectangular region of CTU rows within a particular tile in a picture. A tile can be a rectangular region of CTUs within a particular tile column and a particular tile row in a picture. A tile column is a rectangular region of CTUs having a height equal to the height of the picture and a width specified by syntax elements in the picture parameter set. A tile row is a rectangular region of CTUs having a height specified by syntax elements in the picture parameter set and a width equal to the width of the picture. In some cases, a tile may be partitioned into multiple bricks, each of which can include one or more CTU rows within the tile. A tile that is not partitioned into multiple bricks is also referred to as a brick. However, a brick that is a true subset of a tile is not referred to as a tile. A slice can be an integer number of bricks of a picture that are exclusively contained in a single NAL unit. In some cases, a slice can include either a number of complete tiles or only a consecutive sequence of complete bricks of one tile.

The video coder can be configured to use quadtree partitioning per HEVC, QTBT partitioning, MTT partitioning, or other partitioning structures. For illustrative purposes, the description herein may refer to QTBT partitioning. However, it should be understood that the techniques of this disclosure may also be applied to video coders configured to use quadtree partitioning, or other types of partitioning as well.

In some examples, the one or more slices of a picture are assigned a slice type. Slice types include an I slice, a P slice, and a B slice. An I slice (intra-frames, independently decodable) is a slice of a picture that is only coded by intra-prediction, and therefore is independently decodable since the I slice requires only the data within the frame to predict any prediction unit or prediction block of the slice. A P slice (uni-directional predicted frames) is a slice of a picture that may be coded with intra-prediction and with uni-directional inter-prediction. Each prediction unit or prediction block within a P slice is either coded with Intra prediction or inter-prediction. When the inter-prediction applies, the prediction unit or prediction block is only predicted by one reference picture, and therefore reference image samples are only from one reference region of one frame. A B slice (bi-directional predictive frames) is a slice of a picture that may be coded with intra-prediction and with inter-prediction (e.g., either bi-prediction or uni-prediction). A prediction unit or prediction block of a B slice may be bi-directionally predicted from two reference pictures, where each picture contributes one reference region and image sample sets of the two reference regions are weighted (e.g., with equal weights or with different weights) to produce the prediction signal of the bi-directional predicted block. As explained above, slices of one picture are independently coded. In some cases, a picture can be coded as just one slice.

As noted above, intra-picture prediction utilizes the correlation between spatially neighboring image samples within a picture. Inter-picture prediction uses the temporal correlation between pictures in order to derive a motion-compensated prediction for a block of image samples. Using a translational motion model, the position of a block in a previously decoded picture (a reference picture) is indicated by a motion vector ($\alpha x$, $\Delta y$), with $\Delta x$ specifying the horizontal displacement and $\Delta y$ specifying the vertical displacement of the reference block relative to the position of the current block. In some cases, a motion vector ($\Delta x$, $\Delta y$) can be in integer sample accuracy (also referred to as integer accuracy), in which case the motion vector points to the integer-pel grid (or integer-pixel sampling grid) of the reference frame. In some cases, a motion vector ($\Delta x$, $\Delta y$) can be of fractional sample accuracy (also referred to as fractional-pel accuracy or non-integer accuracy) to more accurately capture the movement of the underlying object, without being restricted to the integer-pel grid of the reference frame. Accuracy of motion vectors may be expressed by the quantization level of the motion vectors. For example, the quantization level may be integer accuracy (e.g., 1-pixel) or fractional-pel accuracy (e.g., ¼-pixel, ½-pixel, or other sub-pixel value). Interpolation is applied on reference pictures to derive the prediction signal when the corresponding motion vector has fractional sample accuracy. For example, image samples available at integer positions can be filtered (e.g., using one or more interpolation filters) to estimate values at fractional positions. The previously decoded reference picture is indicated by a reference index (refIdx) to a reference picture list. The motion vectors and reference indices can be referred to as motion parameters. Two kinds of inter-picture prediction can be performed, including uni-prediction and bi-prediction.

With inter-prediction using bi-prediction, two sets of motion parameters ($\Delta x_0$, $y_0$, $refIdx_0$ and $\Delta x_1$, $y_1$, $refIdx_1$) are used to generate two motion compensated predictions (from the same reference picture or possibly from different reference pictures). For example, with bi-prediction, each prediction block uses two motion compensated prediction signals, and generates B prediction units. The two motion compensated predictions are then combined to get the final motion compensated prediction. For example, the two motion compensated predictions can be combined by averaging. In another example, weighted prediction can be used, in which case different weights can be applied to each motion compensated prediction. The reference pictures that can be used in bi-prediction are stored in two separate lists, denoted as list 0 and list 1. Motion parameters can be derived at the encoder using a motion estimation process.

With inter-prediction using uni-prediction, one set of motion parameters ($\Delta x_0$, $y_0$, $refIdx_0$) is used to generate a motion compensated prediction from a reference picture. For example, with uni-prediction, each prediction block uses at most one motion compensated prediction signal, and generates P prediction units.

A PU may include the data (e.g., motion parameters or other suitable data) related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector ($\Delta x$), a vertical component of the motion vector ($\Delta y$), a resolution for the motion vector (e.g., integer precision, one-quarter pixel precision or one-eighth pixel precision), a reference picture to which the motion vector points, a reference index, a reference picture list (e.g., List 0, List 1, or List C) for the motion vector, or any combination thereof.

The encoding device 104 may then perform transformation and quantization. For example, following prediction, the encoder engine 106 may calculate residual values corresponding to the PU. Residual values may comprise pixel difference values (or image sample difference values) between the current block of pixels (or image samples) being coded (the PU) and the prediction block used to predict the current block (e.g., the predicted version of the current block). For example, after generating a prediction block (e.g., using inter-prediction or intra-prediction), the encoder engine 106 can generate a residual block by subtracting the prediction block produced by a prediction unit from the current block. The residual block includes a set of pixel difference values (or image sample difference values) that quantify differences between pixel values (or image sample values) of the current block and pixel values (or image sample values) of the prediction block. In some examples, the residual block may be represented in a two-dimensional block format (e.g., a two-dimensional matrix or array of pixel values or sample values). In such examples, the residual block is a two-dimensional representation of the pixel values (or image sample values).

Any residual data that may be remaining after prediction is performed is transformed using a block transform, which may be based on discrete cosine transform, discrete sine transform, an integer transform, a wavelet transform, other suitable transform function, or any combination thereof. In some cases, one or more block transforms (e.g., sizes 32×32, 16×16, 8×8, 4×4, or other suitable size) may be applied to residual data in each CU. In some embodiments, a TU may be used for the transform and quantization processes implemented by the encoder engine 106. A given CU having one or more PUs may also include one or more TUs. As described in further detail below, the residual values may be transformed into transform coefficients using the block transforms, and then may be quantized and scanned using TUs to produce serialized transform coefficients for entropy coding.

In some embodiments following intra-predictive or inter-predictive coding using PUs of a CU, the encoder engine 106 may calculate residual data for the TUs of the CU. The PUs may comprise pixel data (or image sample) in the spatial domain (or pixel domain). The TUs may comprise coefficients in the transform domain following application of a block transform. As previously noted, the residual data may correspond to pixel difference values between pixels (or image sample difference values between image samples) of the unencoded picture and prediction values corresponding to the PUs. Encoder engine 106 may form the TUs including the residual data for the CU, and may then transform the TUs to produce transform coefficients for the CU.

The encoder engine 106 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may then be entropy encoded by the encoder engine 106. In some examples, the encoder engine 106 may utilize a predefined scan order to scan the quantized transform coefficients to produce a serialized vector that can be entropy encoded. In some examples, encoder engine 106 may perform an adaptive scan. After scanning the quantized transform coefficients to form a vector (e.g., a one-dimensional vector), the encoder engine 106 may entropy encode the vector. For example, the encoder engine 106 may use context adaptive variable length coding, context adaptive binary arithmetic coding, syntax-based context-adaptive binary arithmetic coding, probability interval partitioning entropy coding, or another suitable entropy encoding technique.

The output 110 of the encoding device 104 may send the NAL units making up the encoded video bitstream data over the communications link 120 to the decoding device 112 of the receiving device. The input 114 of the decoding device 112 may receive the NAL units. The communications link 120 may include a channel provided by a wireless network, a wired network, or a combination of a wired and wireless network. A wireless network may include any wireless interface or combination of wireless interfaces and may include any suitable wireless network (e.g., the Internet or other wide area network, a packet-based network, WiFi™, radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

In some examples, the encoding device 104 may store encoded video bitstream data in storage 108. The output 110 may retrieve the encoded video bitstream data from the encoder engine 106 or from the storage 108. Storage 108 may include any of a variety of distributed or locally accessed data storage media. For example, the storage 108 may include a hard drive, a storage disc, flash memory, volatile or non-volatile memory, or any other suitable digital storage media for storing encoded video data.

The input 114 of the decoding device 112 receives the encoded video bitstream data and may provide the video bitstream data to the decoder engine 116, or to storage 118 for later use by the decoder engine 116. The decoder engine 116 may decode the encoded video bitstream data by entropy decoding (e.g., using an entropy decoder) and extracting the elements of one or more coded video sequences making up the encoded video data. The decoder engine 116 may then rescale and perform an inverse transform on the encoded video bitstream data. Residual data is then passed to a prediction stage of the decoder engine 116. The decoder engine 116 then predicts a block of pixels or image samples (e.g., a PU). In some examples, the prediction is added to the output of the inverse transform (the residual data).

The decoding device 112 may output the decoded video to a video destination device 122, which may include a display or other output device for displaying the decoded video data to a consumer of the content. In some aspects, the video destination device 122 may be part of the receiving device that includes the decoding device 112. In some aspects, the video destination device 122 may be part of a separate device other than the receiving device.

In some embodiments, the video encoding device 104 and/or the video decoding device 112 may be integrated with an audio encoding device and audio decoding device, respectively. The video encoding device 104 and/or the video decoding device 112 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 104 and the video decoding device 112 may be integrated as part of a combined encoder/decoder (codec) in a respective device. An example of specific details of the encoding device 104 is described below with reference to FIG. 13. An example of specific details of the decoding device 112 is described below with reference to FIG. 14.

Extensions to the HEVC standard include the Multiview Video Coding extension, referred to as MV-HEVC, and the Scalable Video Coding extension, referred to as SHVC. The MV-HEVC and SHVC extensions share the concept of layered coding, with different layers being included in the encoded video bitstream. Each layer in a coded video sequence is addressed by a unique layer identifier (ID). A layer ID may be present in a header of a NAL unit to identify a layer with which the NAL unit is associated. In MV-HEVC, different layers can represent different views of the same scene in the video bitstream. In SHVC, different scalable layers are provided that represent the video bitstream in different spatial resolutions (or picture resolution) or in different reconstruction fidelities. The scalable layers may include a base layer (with layer ID=0) and one or more enhancement layers (with layer IDs=1, 2, . . . n). The base layer may conform to a profile of the first version of HEVC, and represents the lowest available layer in a bitstream. The enhancement layers have increased spatial resolution, temporal resolution or frame rate, and/or reconstruction fidelity (or quality) as compared to the base layer. The enhancement layers are hierarchically organized and may (or may not) depend on lower layers. In some examples, the different layers may be coded using a single standard codec (e.g., all layers are encoded using HEVC, SHVC, or other coding standard). In some examples, different layers may be coded using a multi-standard codec. For example, a base layer may be coded using AVC, while one or more enhancement layers may be coded using SHVC and/or MV-HEVC extensions to the HEVC standard.

In general, a layer includes a set of VCL NAL units and a corresponding set of non-VCL NAL units. The NAL units are assigned a particular layer ID value. Layers can be hierarchical in the sense that a layer may depend on a lower layer. A layer set refers to a set of layers represented within a bitstream that are self-contained, meaning that the layers within a layer set can depend on other layers in the layer set in the decoding process, but do not depend on any other layers for decoding. Accordingly, the layers in a layer set can form an independent bitstream that can represent video content. The set of layers in a layer set may be obtained from another bitstream by operation of a sub-bitstream extraction process. A layer set may correspond to the set of layers that is to be decoded when a decoder wants to operate according to certain parameters.

As previously described, an HEVC bitstream includes a group of NAL units, including VCL NAL units and non-VCL NAL units. VCL NAL units include coded picture data forming a coded video bitstream. For example, a sequence of bits forming the coded video bitstream is present in VCL NAL units. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). Examples of goals of the parameter sets include bit rate efficiency, error resiliency, and providing systems layer interfaces. Each slice references a single active PPS, SPS, and VPS to access information that the decoding device 112 may use for decoding the slice. An identifier (ID) may be coded for each parameter set, including a VPS ID, an SPS ID, and a PPS ID. An SPS includes an SPS ID and a VPS ID. A PPS includes a PPS ID and an SPS ID. Each slice header includes a PPS ID. Using the IDs, active parameter sets can be identified for a given slice.

A PPS includes information that applies to all slices in a given picture. Because of this, all slices in a picture refer to the same PPS. Slices in different pictures may also refer to the same PPS. An SPS includes information that applies to all pictures in a same coded video sequence (CVS) or bitstream. As previously described, a coded video sequence is a series of access units (AUs) that starts with a random access point picture (e.g., an instantaneous decode reference (IDR) picture or broken link access (BLA) picture, or other appropriate random access point picture) in the base layer and with certain properties (described above) up to and not including a next AU that has a random access point picture in the base layer and with certain properties (or the end of the bitstream). The information in an SPS may not change from picture to picture within a coded video sequence. Pictures in a coded video sequence may use the same SPS. The VPS includes information that applies to all layers within a coded video sequence or bitstream. The VPS includes a syntax structure with syntax elements that apply to entire coded video sequences. In some embodiments, the VPS, SPS, or PPS may be transmitted in-band with the encoded bitstream. In some embodiments, the VPS, SPS, or PPS may be transmitted out-of-band in a separate transmission than the NAL units containing coded video data.

A video bitstream can also include Supplemental Enhancement Information (SEI) messages. For example, an SEI NAL unit can be part of the video bitstream. In some cases, an SEI message can contain information that is not needed by the decoding process. For example, the information in an SEI message may not be essential for the decoder to decode the video pictures of the bitstream, but the decoder can use the information to improve the display or processing of the pictures (e.g., the decoded output). The information in an SEI message can be embedded metadata. In one illustrative example, the information in an SEI message could be used by decoder-side entities to improve the viewability of the content. In some instances, certain application standards may mandate the presence of such SEI messages in the bitstream so that the improvement in quality can be brought to all devices that conform to the application standard (e.g., the carriage of the frame-packing SEI message for frame-compatible plano-stereoscopic 3DTV video format, where the SEI message is carried for every frame of the video, handling of a recovery point SEI message, use of pan-scan scan rectangle SEI message in DVB, in addition to many other examples).

As previously described, media formats can be used for encapsulating coded video. One example of a media format includes the ISO base media file format (ISOBMFF, specified in ISO/IEC 14496-12, which is hereby incorporated by reference in its entirety and for all purposes). There are also other media file formats derived from the ISOBMFF (ISO/IEC 14496-12), including MPEG-4 file format (ISO/IEC 14496-14), 3GPP file format (3GPP TS 26.244) and AVC file format (ISO/IEC 14496-15). For example, a video bitstream encoded as discussed above can be written or packed into one or more files using the ISOBMFF, a file format derived from the ISOBMFF, some other file format, and/or a combination of file formats including the ISOBMFF. The ISOBMFF file or files can be played back using a video player device, can be transmitted by an encoding device (or file generation device) and then displayed by a player device, can be stored, and/or can be used in any other suitable manner.

The ISOBMFF is used as the basis for many codec encapsulation formats (e.g., the AVC file format, among others), as well as for many multimedia container formats (e.g., the MPEG-4 file format, the 3GPP file format (3GP), the DVB file format, among others). Continuous media (e.g., audio and video), static media (e.g., images), as well as metadata can be stored in a file conforming to the ISOBMFF. Files structured according to the ISOBMFF may be used for many purposes, including local media file playback, progressive downloading of a remote file, segments for Dynamic Adaptive Streaming over HTTP (DASH), containers for content to be streamed and packetization instructions for the content, recording of received real-time media streams, among other suitable purposes. For example, although originally designed for storage, the ISOBMFF has proven to be very valuable for media streaming (e.g. for progressive download or DASH). For streaming purposes, movie fragments defined in ISOBMFF can be used.

The ISOBMFF is designed to contain timed media information in a flexible and extensible format that facilitates interchange, management, editing, and presentation of the media. Presentation of the media may be "local" to the system containing the presentation or the presentation may be via a network or other stream delivery mechanism (e.g., DASH or other suitable streaming mechanism). A "presentation," as defined by the ISOBMFF specification, can include media files related to a sequence of pictures, often related by having been captured sequentially by a video capture device, or related for some other reason. In some examples, a presentation may also be referred to as a movie, a video presentation, or a rendering. In some examples, a presentation may include audio. A single presentation may be contained in one or more files, with one file containing the metadata for the whole presentation. The metadata includes information such as timing and framing data, descriptors, pointers, parameters, and other information that describes the presentation. Metadata does not include the video and/or audio data itself. Files other than the file that contains the metadata need not be formatted according to the ISOBMFF, and need only be formatted such that these files can be referenced by the metadata.

The file structure of an ISO base media file is object-oriented, and the structure of an individual object in the file can be inferred directly from the object's type. The objects in an ISO base media file are referred to as "boxes" by the ISOBMFF specification. An ISO base media file is structured as a sequence of boxes, which can contain other boxes. A box is the elementary syntax structure in the ISOBMFF, including a four-character coded box type, the byte count of the box, and the payload. Boxes can include a header that provides a size and a type for the box. The size describes the entire size of the box, including the header, fields, and all boxes contained within the box. Boxes with a type that is not recognized by a player device are typically ignored and skipped.

An ISOBMFF file can contain different kinds of boxes. For example, a Movie box ("moov") contains the metadata for the continuous media streams present in the file, with each media stream being represented in the file as a track. The metadata for a track is enclosed in a Track box ("trak"), while the media content of a track is either enclosed in a Media Data box ("mdat") or directly in a separate file. There can be different kinds of trackers. The ISOBMFF specifies, for example, the following types of tracks: a media track, which contains an elementary media stream; a hint track, which either includes media transmission instructions or represents a received packet stream; and a timed metadata track, which comprises time-synchronized metadata.

The media content for tracks include a sequence of samples, such as audio or video access units or frames, referred to as media samples. Such media samples are differentiated from an image sample described above, where an image sample is an individual color component of a pixel. As used herein, the term "media sample" refers to the media data (audio or video) associated with a single time (e.g., a single point in time, a time range, or other time). The metadata for each track includes a list of sample description entries, each providing the coding or encapsulation format used in the track and the initialization data needed for processing that format. Each sample is associated with one of the sample description entries of the track.

The ISOBMFF enables the use of sample-specific metadata using various mechanisms. Specific boxes within a Sample Table box ("stbl") have been standardized to respond to common needs. For example, a Sync Sample box ("stss") can be used to list the random access samples of the track. The sample grouping mechanism enables mapping of samples, according to a four-character grouping type, into groups of samples sharing the same property, specified as a sample group description entry in the file. Several grouping types have been specified in the ISOBMFF.

Figure 2:
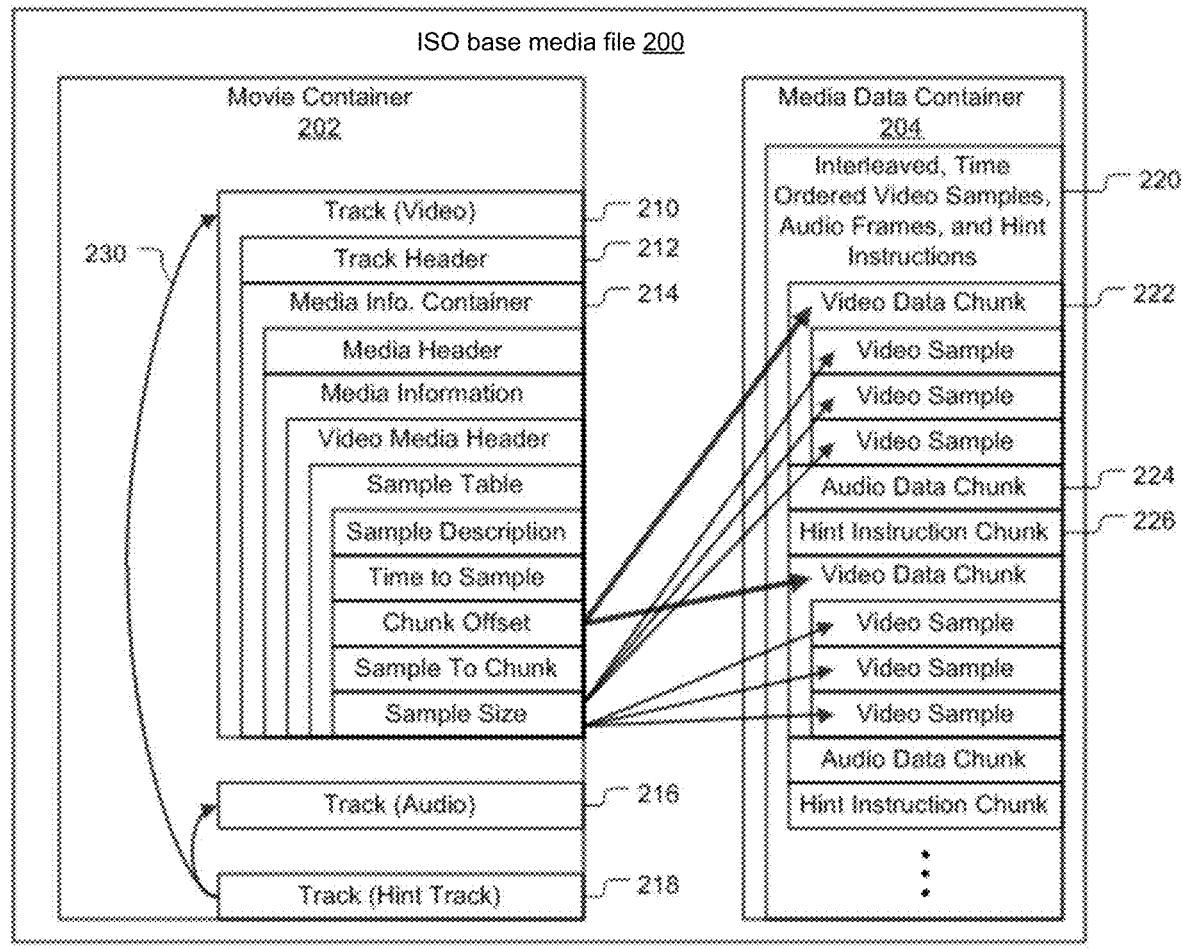
FIG. 2 is a diagram illustrating an example file structure following the ISO base media file format (ISOBMFF), in accordance with some examples.

FIG. 2 is a diagram illustrating an example of a file 200 with a file structure following the ISO base media file format. The ISO base media file 200 can also be referred to as a media format file. A media presentation can be, but is not always, contained in one file, in which case the media presentation is self-contained in the file. The file 200 includes a movie container 202 (or "movie box"). The movie container 202 may contain the metadata of the media, which can include, for example, one or more video tracks and one or more audio tracks. For example, a video track 210 may contain information about various layers of a video, which may be stored in one or more media information containers 214. For instance, a media information container 214 may include a sample table, which provides information about the video samples for the video. In various implementations, the video data chunk 222 and the audio data chunk 224 are contained in the media data container 204. In some implementations, the video data chunk 222 and the audio data 224 can be contained in one or more other files (other than file 200).

In various implementations, a presentation (e.g., a motion sequence) may be contained in several files. All timing and framing (e.g., position and size) information can be in the ISO base media file and the ancillary files may essentially use any format.

The ISO files have a logical structure, a time structure, and a physical structure. The different structures are not required to be coupled. The logical structure of the file is of a movie that in turn contains a set of time-parallel tracks (e.g., video track 210). The time structure of the file is that the tracks contain sequences of samples in time, and those sequences are mapped into the timeline of the overall movie by optional edit lists.

The physical structure of the file separates the data needed for logical, time, and structural de-composition, from the media data samples themselves. This structural information is concentrated in a movie box (e.g., movie container 202), possibly extended in time by movie fragment boxes. The movie box documents the logical and timing relationships of the samples, and also contains pointers to where the samples are located. Pointers may point into the same file or another file, which can be referenced by, for example, a Uniform Resource Locator (URL) or the like.

Each media stream is contained in a track specialized for that media type. For example, in the example illustrated in FIG. 2, the movie container 202 includes a video track 210 and an audio track 216. The movie container 202 may also include a hint track 218, which may include transmission instructions from the video track 210 and/or audio track 216, or may represent other information about other tracks in the movie container 202 or other movie container (not shown) of the file 200. Each track may be further parameterized by a sample entry. For example, in the illustrated example, the video track 210 includes a media information container 214, which includes a table of sample (referred to as a "sample table"). A sample entry contains the "name" of the exact media type (e.g., the type of the decoder needed to decode the stream) and any parameterization of that decoder needed. The name may take the form of a four-character code (e.g., moov, trak, or other suitable name code). There are defined sample entry formats for various media types. The sample entries may further include pointers to video data chunks (e.g., video data chunk 222) in a box 220 in the media data container 204. The box 220 includes interleaved, time ordered video samples (organized into video data chunks, such as video data chunk 222), audio frames (e.g., in audio data chunk 224), and hint instructions (e.g., in hint instruction chunk 226).

Support for metadata can take different forms. In one example, timed metadata may be stored in an appropriate track, and can be synchronized as desired with the media data described by the metadata. In a second example, there is general support for non-timed metadata attached to the movie or to an individual track. The structural support is general, and allows, as in the media data, the storage of metadata resources elsewhere in the file or in another file.

In some cases, one track in a video file can contain multiple layers. The video track may also include a track header (e.g., track header 212), which may contain some information about the contents of the video track (e.g., video track 210). For example, the track header may include a track content information (also referred to as 'tcon') box. The tcon box may list all of the layers and sub-layers in the video track. A video file may also include an operating point information box (also referred to as an 'oinf' box). The oinf box records information about operating points, such as the layers and sub-layers that constitute the operating point, dependencies (if any) between the operating points, the profile, level, and tier parameter of the operating point, and other such operating point relevant information. In some cases, an operating point can also be referred to as an operation point.

Figure 3:
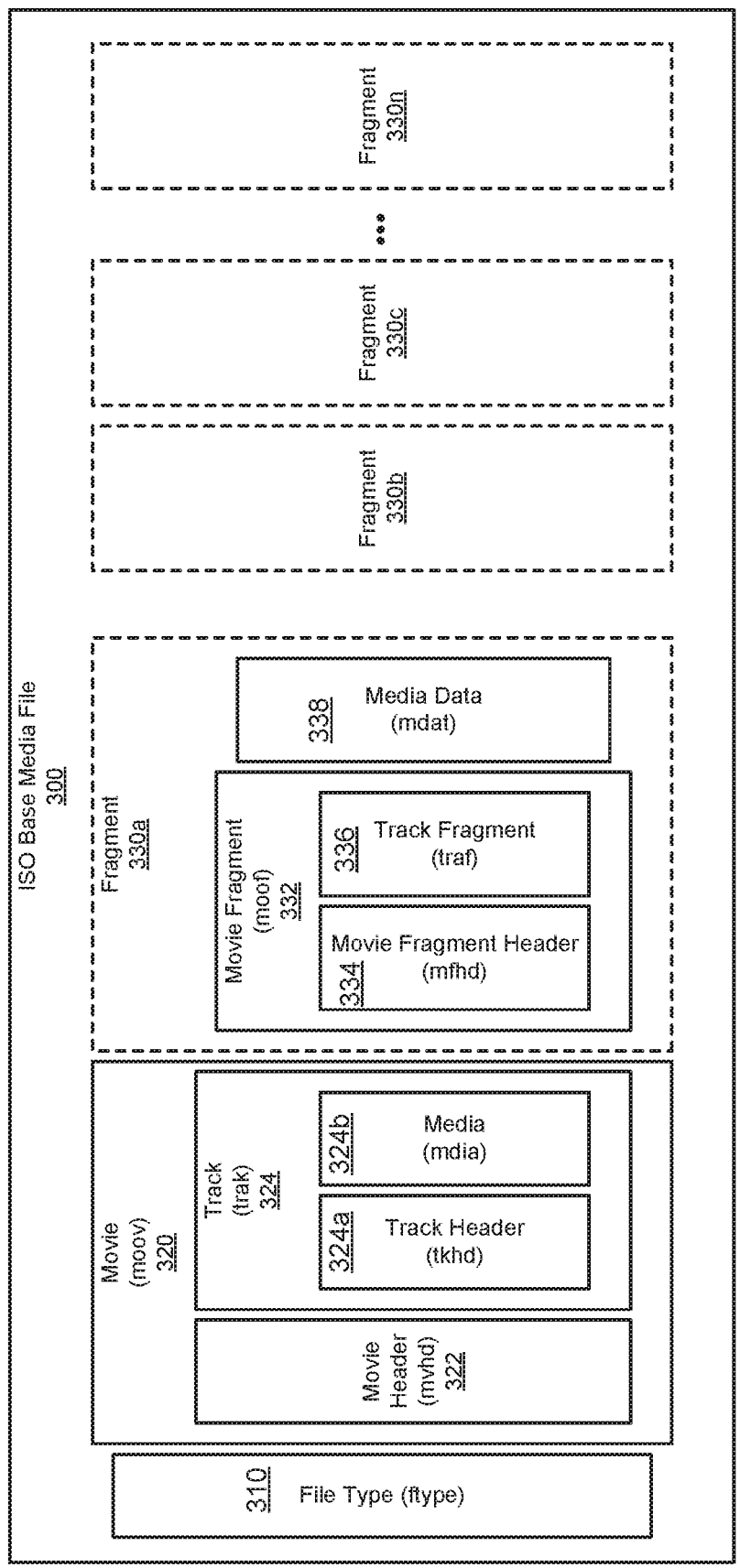
FIG. 3 is a diagram illustrating an example of an ISO base media file (formatted according to the ISOBMFF) that contains data and metadata for a video presentation, in accordance with some examples.

FIG. 3 is a diagram illustrating another example of an ISO base media file 300 formatted according to the ISOBMFF. The ISO base media file 300 can also be referred to as a media format file. The ISO base media file 300 contains data and metadata for a video presentation. At the top level of the file 300, there is included a file type box 310, a movie box 320, and one or more fragments 330a, 330b, 330c, through 330n. Other boxes that can be included at this level but that are not represented in this example include free space boxes, metadata boxes, and media data boxes, among others.

The file type box 310 is identified by the box type "ftyp." The file type box 310 is typically placed as early as possible in the ISO base media file 300. The file type box 310 identifies an ISOBMFF specification that is the most suitable for parsing the file. "Most" in this instance means that the ISO base media file 300 may have been formatted according to a particular ISOBMFF specification, but is likely compatible with other iterations of the specification. This most suitable specification is referred to as the major brand. A player device can use the major brand to determine whether the device is capable of decoding and displaying the contents of the file. The file type box 310 can also include a version number, which can be used to indicate a version of the ISOBMFF specification. The file type box 310 can also include a list of compatible brands, which includes a list of others brands with which the file is compatible. An ISO base media file can be compatible with more than one major brand.

When an ISO base media file includes a file type box (like the ISO base media file 300), there is only one file type box. In some cases, an ISO base media file may omit the file type box in order to be compatible with older player devices. When an ISO base media file does not include a file type box, a player device can assume a default major brand (e.g. mp41), a minor version (e.g., "0"), and a compatible brand (e.g., mp41, isom, iso2, avc1, or the like).

The ISO base media file 300 further includes a movie box 320, which contains the metadata for the presentation. The movie box 320 is identified by the box type "moov." ISO/IEC 14496-12 provides that a presentation, whether contained in one file or multiple files, can include only one movie box 320. Frequently, the movie box is near the beginning of an ISO base media file (e.g., as indicated by the placement of the movie box 320 in the ISO base media file 300). The movie box 320 includes a movie header box 322, and can include one or more track boxes 324 as well as other boxes.

The movie header box 322, identified by the box type "mvhd," can include information that is media-independent and relevant to the presentation as a whole. For example, the movie header box 322 can include information such as a creation time, a modification time, a timescale, and/or a duration for the presentation, among other things. The movie header box 322 can also include an identifier that identifies the next track in the presentation. For example, the identifier can point to the track box 324 contained by the movie box 320 in the illustrated example.

The track box 324, identified by the box type "trak," can contain the information for a track for a presentation. A presentation can include one or more tracks, where each track is independent of other tracks in the presentation. Each track can include the temporal and spatial information that is specific to the content in the track, and each track can be associated with a media box. The data in a track can be media data, in which case the track is a media track, or the data can be packetization information for streaming protocols, in which case the track is a hint track. Media data includes, for example, video and audio data. In the example shown in FIG. 3, the example track box 324 includes a track header box 324a and a media box 324b. A track box can include other boxes, such as a track reference box, a track group box, an edit box, a user data box, a meta box, among others.

The track header box 324a, identified by the box type "tkhd," can specify the characteristics of a track contained in the track box 324. For example, the track header box 324a can include a creation time, modification time, duration, track identifier, layer identifier, group identifier, volume, width, and/or height of the track, among other things. For a media track, the track header box 324a can further identify whether the track is enabled, whether the track should be played as part of the presentation, whether the track can be used to preview the presentation, among other uses of the track. Presentation of a track is generally assumed to be at the beginning of a presentation. The track box 324 can include an edit list box (not shown) that can include an explicit timeline map. The timeline map can specify, among other things, an offset time for the track, where the offset indicates a start time, after the beginning of the presentation, for the track.

In the illustrated example, the track box 324 also includes a media box 324b, identified by the box type "mdia." The media box 324b can contain the objects and information about the media data in the track. For example, the media box 324b can contain a handler reference box, which can identify the media type of the track and the process by which the media in the track is presented. As another example, the media box 324b can contain a media information box, which can specify the characteristics of the media in the track. The media information box can further include a table of samples, as described above with respect to FIG. 2, where each sample describes a chunk of media data (e.g., video or audio data) including, for example, the location of the data for the sample. The data for a sample is stored in a media data box, discussed further below. As with most other boxes, the media box 324b can also include a media header box.

In the illustrated example, the example ISO base media file 300 also includes multiple fragments 330a, 330b, 330c, through 330n of the presentation. A fragment can also be referred to as a movie fragment. A fragment (e.g., which in some cases can include a Common Media Application Format (CMAF) chunk) can extend a presentation in time. In some examples, a fragment can provide information that may have been included in a movie box ("moov"). A movie fragment (or CMAF chunk) can include at least a movie fragment box (identified by the box type "moof"), followed by a Media Data box (identified by the box type "mdat"). For example, the fragment 330a can include the movie fragment (moof) box 332 and the media data (mdat) box 338, and can extend a presentation by including additional information that would otherwise be stored in the movie box 320. The fragments 330a, 330b, 330c, through 330n are not ISOBMFF boxes, but rather describe a movie fragment box and a media data box that is referenced by the movie fragment box (e.g., the movie fragment box 332 and media data box 338 are referenced by the movie fragment box 332). The movie fragment box 332 and media data box 338 are top-level boxes, but are grouped here to indicate the relationship between a movie fragment box 332 and a media data box 338. Using movie fragment boxes (e.g., movie fragment box 332), a presentation can be built incrementally.

In some examples, the movie fragment box 332 can include a movie fragment header box 334 and a track fragment box 336, as well as other boxes not illustrated here. The movie fragment header box 334, identified by the box type "mfhd," can include a sequence number. A player device can use the sequence number to verify that the fragment 330a includes the next piece of data for the presentation. In some cases, the contents of a file, or the files for a presentation, can be provided to a player device out of order. For example, network packets can frequently arrive in an order other than in the order that the packets were originally transmitted. In these cases, the sequence number can assist a player device in determining the correct order for fragments.

The movie fragment box 332 can also include one or more track fragment boxes 336, identified by the box type "traf." A movie fragment box 332 can include a set of track fragments, zero or more per track. The track fragments can contain zero or more track runs, each of which describes a contiguous run of samples for a track. Track fragments can be used to add empty time to a track, in addition to adding samples to the track.

The media data box 338, identified by the box type "mdat," contains media data. In video tracks, the media data box 338 can contain video frames, access units, NAL units, or other form of video data. A media data box can alternatively or additionally include audio data. A presentation can include zero or more media data boxes, contained in one or more individual files. The media data is described by metadata. In the illustrated example, the media data in the media data box 338 can be described by metadata included in the track fragment box 336 of the movie fragment box 332. In other examples, the media data in a media data box can be described by metadata in the movie box 320. The metadata can refer to a particular media data by an absolute offset within the file 300, such that a media data header and/or free space within the media data box 338 can be skipped.

Other fragments 330b, 330c, through 330n in the ISO base media file 300 can contain boxes similar to those illustrated for the first fragment 330a, and/or can contain other boxes.

As noted above, the ISOBMFF includes support for streaming media data over a network, in addition to supporting local playback of the media. The file or files that include one movie presentation can include additional tracks, called hint tracks, which contain instructions that can assist a streaming server in forming and transmitting the file or files as packets. These instructions can include, for example, data for the server to send (e.g., header information) or references to segments of the media data. A segment can include a portion of an ISO base media file format file, including a movie box along with associated media data and other boxes if present. A segment can also include a portion of an ISO base media file format file, including one or more movie fragment boxes, along with associated media data and other boxes if present. A file can include separate hint tracks for different streaming protocols. Hint tracks can also be added to a file without needing to reformat the file.

One method for streaming media data is Dynamic Adaptive Streaming over HyperText Transfer Protocol (HTTP), or DASH (defined in ISO/IEC 23009-1:2014). DASH, which is also known as MPEG-DASH, is an adaptive bitrate streaming technique that enables high quality streaming of media content using conventional HTTP web servers. DASH operates by breaking the media content into a sequence of small HTTP-based file segments, where each segment contains a short time interval of the content. Using DASH, a server can provide the media content at different bit rates. A client device that is playing the media can select among the alternative bit rates when downloading a next segment, and thus adapt to changing network conditions. DASH uses the HTTP web server infrastructure of the Internet to deliver content over the World Wide Web. DASH is independent of the codec used to encode and decode the media content, and thus operates with codecs such as H.264 and HEVC, among others.

As noted above, ISO/IEC 14496-12 ISO base media file format (ISOBMFF) specifies the carriage format for media, and is being used in many, if not most, streaming applications (including MPEG DASH). These application of MPEG DASH and Common Media Application Format (CMAF) are being adapted also for low-latency streaming with the target of reducing the file-format related delays down to typical sample durations of audio and video (e.g., in the range of a few tens of milliseconds, as opposed to the order of a second in traditional streaming).

Traditionally, for live streaming applications, "low latency" was used to refer to packaging delays of the order of a second. To achieve this, media flies can segmented into individually addressable segments having durations of approximately 1-2 seconds. Each segment can be addressed, for example, by a Uniform Resource Locator (URL).

Figure 4:
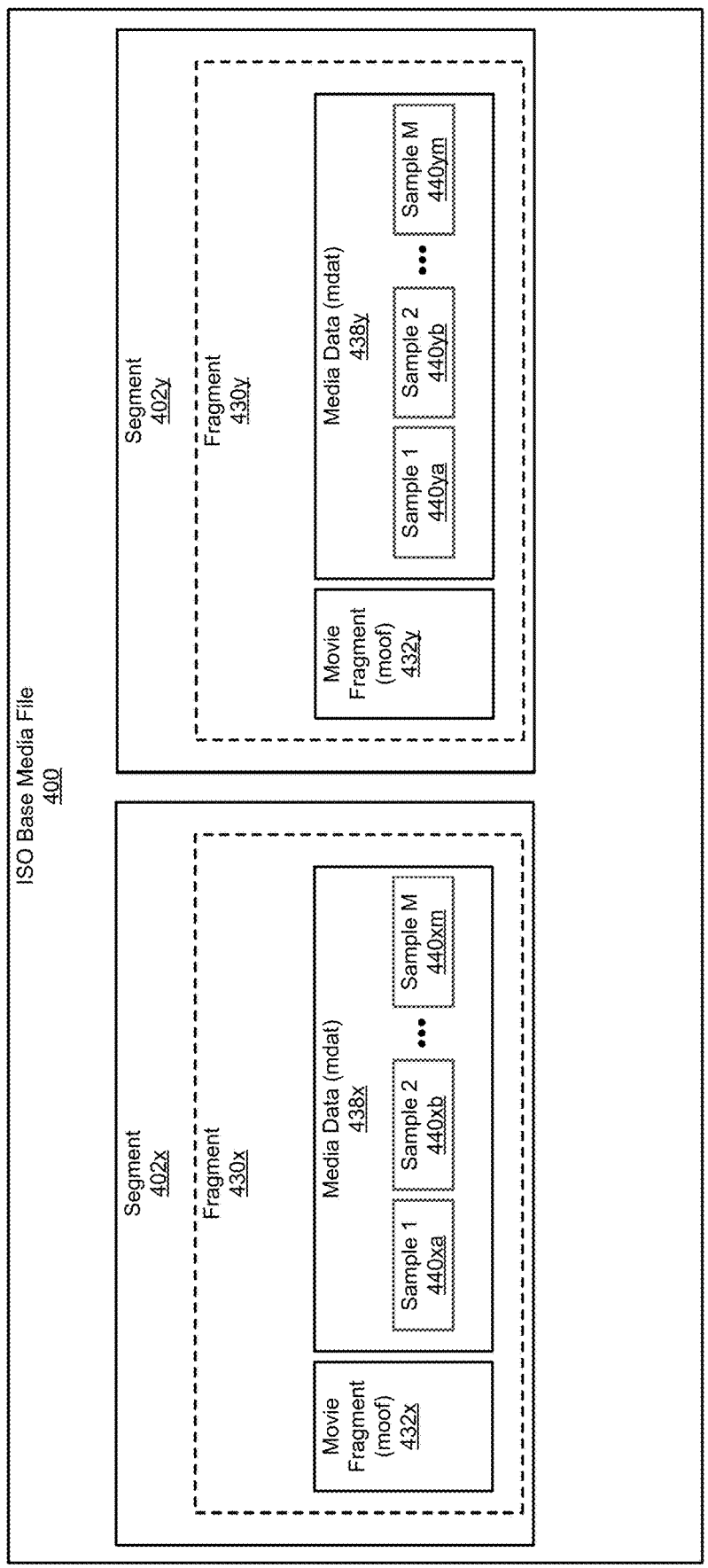
FIG. 4 is a diagram illustrating an example of segmentation for live streaming media, in accordance with some examples.

FIG. 4 is a diagram illustrating another example of an ISO base media file 400 formatted according to the ISOBMFF. The ISO base media file 400 can be segmented for live streaming. The ISO base media file 400 is shown to contain two example segments 402$x$ and 402$y$. The segments 402$x$ and 402$y$ can be segments which are streamed sequentially, with segment 402$y$ immediately following segment 402$x$. In an example, each of the segments 402$x$ and 402$y$ contain a single movie fragment, respectively shown as fragments 430$x$ and 430$y$. The fragments 430$x$ and 430$y$ can include respective movie fragment (moof) boxes 432$x$ and 432$y$, along with media data (mdat) boxes 438$x$ and 438$y$. The individual mdat boxes 438$x$ and 438$y$ can each contain more than one media data sample, shown as samples 1-M, respectively labeled samples 440$xa$-$xm$ in mdat box 438$x$ and samples 440$ya$-$ym$ in mdat box 438$y$. The samples 1-M in the mdat boxes 438$x$-$y$ can be time ordered video samples (e.g., organized into video data chunks) or audio frames.

A file-format related latency can be associated with the format of the ISO base media file 400, where the data in the fragments 430$x$ and 430$y$ are decodable by a decoder or player device only after respective data of the fragments 430$x$ and 430$y$ is completely encoded. Since each of the segments 402$x$ and 402$y$ contains a single fragment 430$x$ and 430$y$ respectively, the latency for completely encoding a fragment 430$x$ or 430$y$ corresponds to the duration of a respective segment 402$x$ or 402$y$. The respective moof boxes 432$x$ and 432$y$ of the fragments 430$x$ and 430$y$ contain signaling for durations, sizes, etc., for all samples in the respective fragments 430$x$ and 430$y$. Thus, the data from all the M samples, including the last sample M (440$xm$ and 440$ym$) in the respective fragments 430$x$ and 430$y$ would be needed at the encoder or packager before the respective moof boxes 432$x$ and 432$y$ can be completely rewritten. The moof boxes 432$x$ and 432$y$ would be needed for processing or decoding the respective fragments 430$x$ and 430$y$ by the decoder or player device. Thus, the time for encoding the entire segment data of the segments 402$x$ and 402$y$ can include a time duration for encoding all of the samples 1-M in the mdat boxes 438$x$-$y$. This time duration for encoding all of the samples 1-M can constitute a significant delay or file-format related latency associated with each one of the segments 402$x$-$y$. This type of delay can be present in typical live streaming examples, for playing video on demand, and/or in other media systems.

Figure 5:
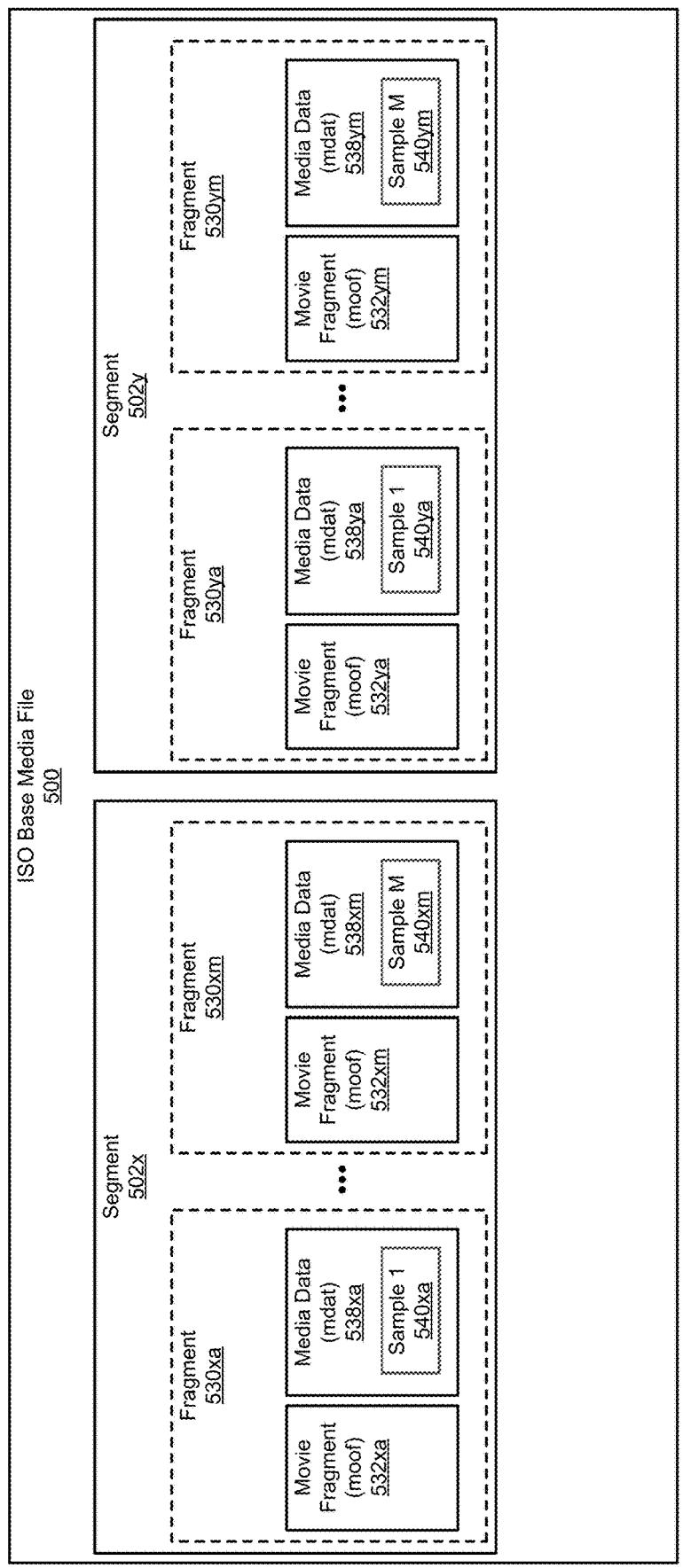
FIG. 5 is a diagram illustrating an example of fragmentation for low-latency live streaming media, in accordance with some examples.

FIG. 5 is a diagram illustrating another example of an ISO base media file 500 formatted according to the ISOBMFF. The ISO base media file 500 can include an optimization over the ISO base media file 400 of FIG. 4. For example, the format of the ISO base media file 500 can lead to a lower latency than the latency associated with encoding all of the samples 1-M in the mdat boxes 438$x$-$y$ discussed above.

As shown, the format of the ISO base media file 500 divides each segment into a larger number of fragments (also referred to as "fragmentation" of the segments) such that a smaller number of samples is in each fragment of a segment, while the overall number of samples in each segment can be the same or similar to that of the ISO base media file 400. Since the number of samples in a segment of the ISO base media file 500 can remain the same as in ISO base media file 400, the fragmentation of the segments in the ISO base media file 500 do not adversely impact addressing schemes for the samples. In the illustrated example, the segments 502$x$ and 502$y$ are shown in the ISO base media file 500. In some examples, the segments 502$x$ and 502$y$ can be streamed sequentially, with segment 502$y$ immediately following segment 502$x$. The segments 502$x$ and 502$y$ can each include multiple fragments, such as the fragments 530$xa$-$xm$ included in the segment 502$x$ and the fragments 530$ya$-$ym$ included in the segment 502$y$. Each of these fragments can include a movie fragment (moof) box and a media data (mdat) box, where each mdat box can contain a single sample. For example, the fragments 530$xa$-$xm$ each contain respective moof boxes 532$xa$-$xm$ and mdat boxes 538$xa$-$xm$, with each of the mdat boxes 538$xa$-$xm$ containing a respective sample 540$xa$-$xm$. Similarly, the fragments 530$ya$-$ym$ each contain respective moof boxes 532$ya$-$ym$ and mdat boxes 538$ya$-$ym$, with each of the mdat boxes 538$ya$-$ym$ containing a respective sample 540$ya$-$ym$. While a single sample is illustrated in each of the mdat boxes 538$xa$-$xm$ and 538$ya$-$ym$, in some examples, it is possible to have a higher number but still a low number of samples in each of the mdat boxes (e.g., 1-2 samples per mdat box).

Given the low number of samples in each of the mdat boxes 538$xa$-$xm$ and 538$ya$-$ym$, the respective fragments 530$xa$-$xm$ and 530$ya$-$ym$ are decodable at lower latencies or higher speeds in comparison to the fragments 430$x$-$y$ of FIG. 4. Thus, the file-format related latencies of FIG. 4 can be reduced because each movie fragment can be decodable by the client or player device. For example, the file-format related delay for a complete segment's duration is reduced to the delay of encoding the low number of the samples in each fragment. For example, in the illustrated case of a single sample 540$xa$ in the fragment 530$xa$ as shown in the segment 502$x$, the latency for decoding the fragment 530$xa$ can be based on the duration of the single sample 540$xa$, as opposed to the collective duration of multiple samples. Although there may be a small increase in latency for the segments 502$x$-$y$ given the larger number of fragments in the segments 502*x-y*, this increase may not be significant for typical high-quality media bitrates.

Figure 6:
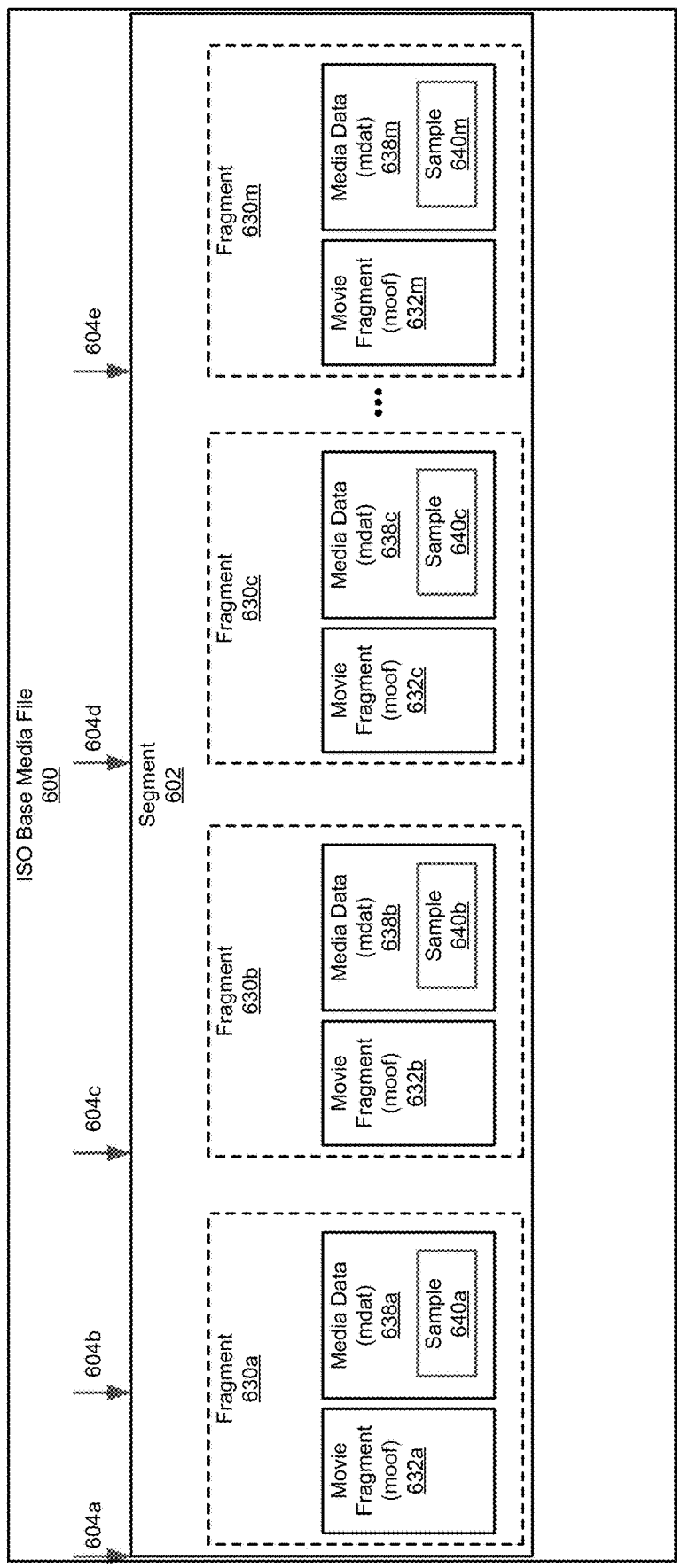
FIG. 6 is a diagram illustrating another example of fragmentation for low-latency live streaming media, in accordance with some examples.

FIG. 6 is a diagram illustrating another example of an ISO base media file 600 formatted according to the ISOBMFF. The ISO base media file 600 can include a variation of the ISO base media file 500 of FIG. 5, where the ISO base media file 600 can contain a single segment 602, rather than the multiple segments 502*x-y* shown in the ISO base media file 500 of FIG. 5. The single segment 602 can be fragmented to include the multiple fragments 630*a-m*, with each fragment having a respective movie fragment (moof) box 632-*m* and media data (mdat) box 638*a-m*. The mdat boxes 638*a-m* can each have a low number of samples such as a single sample. For example, the samples 640*a-m* can each be contained in a respective mdat box 638*a-m* as shown. Similar to the optimization discussed with reference to FIG. 5, the fragmentation in the ISO base media file 600 of FIG. 6 can also achieve low latency for decoding each fragment because the latency is based on the sample duration of a single sample (or low number of samples).

While the ISO base media file 600 can be used by the player device for presenting conventional media, such as audio or video, there are challenges involved for sparse media. As will be discussed further below, sparse media can include subtitles, interactive graphics, or other displayable content that can remain unchanged over multiple fragments. In presenting the sparse media which remains constant across multiple samples, removing a sample and then possibly providing another sample with the same content may be possible, but may also result in undesired behavior such as flickering as the sample is removed and represented. For such sparse media or sparse tracks included in the samples such as the samples 640*a-m*, the related sparse metadata (e.g., the moof boxes 632-*m*, the mdat boxes 638*a-m*, etc.) may need to be customized to address these challenges. For example, it may be desirable to have an indication at the beginning of a sample, segment, fragment, or file (e.g., at a random access point) to render the sample, segment, fragment, or file until indicated otherwise. For example, the indications 604*a* can identify a beginning of the segment 602, the indication 604*b* can identify the beginning of the mdat box 638*a*, the indications 604*c*, 604*d*, and 604*e* can identify the beginning of the fragments 630*b*, 630*c*, and 630*m*, respectively. However, there are currently no existing mechanisms for providing indications such as the indications 604*a-e*, or others, for ISO base media files formatted according to the ISOBMFF As previously noted, media data can also be streamed and delivered using a Dynamic Adaptive Streaming (DASH) over HyperText Transfer Protocol (HTTP) using conventional HTTP web servers. For example, it is possible for each movie fragment or a concatenation of multiple movie fragments to be delivered using a HTTP Chunked Transfer. The HTTP Chunked Transfer can allow the media to be requested by a DASH client device (e.g., a player device). A segment of the requested media can be delivered by a host or an Origin Server to the DASH client before the segment is completely encoded. Allowing such HTTP Chunked Transfer can reduce the latencies or end-to-end delays involved in transferring the media data.

Figure 7:
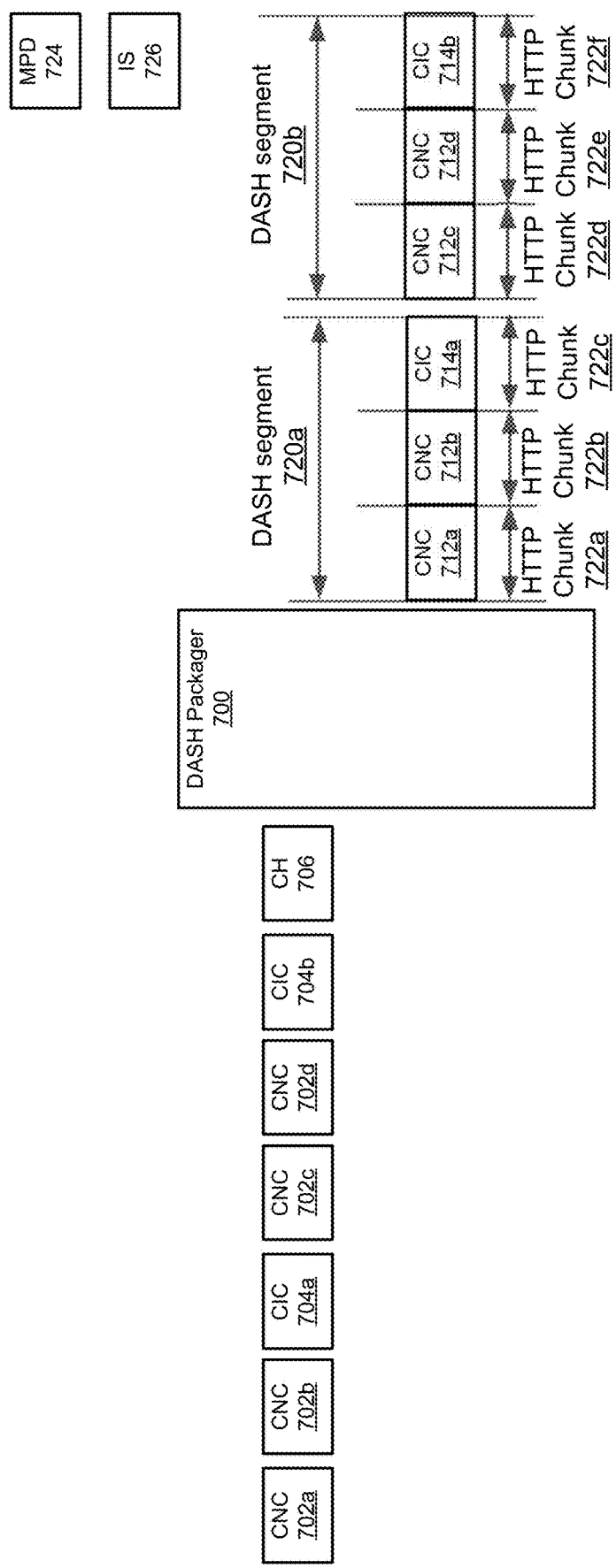
FIG. 7 is a diagram illustrating an example of a DASH Packager for normal operation of audio and video, in accordance with some examples.

FIG. 7 is a diagram illustrating an example of a DASH Packager 700. The DASH Packager 700 can be configured for transferring media data such as video and/or audio using HTTP Chunks. A server or host device (e.g., an encoder) can transfer media data to be packaged by the DASH Packager 700, where the DASH Packager can create the HTTP Chunks to be transferred to the client or player device (e.g., a decoder). Various chunks of media data which can be obtained by the DASH Packager 700 from an encoder are shown in FIG. 7. The chunks can be provided as Common Media Application Format (CMAF) chunks. These CMAF chunks can include a CMAF Header (CH) 706, one or more CMAF initial chunks (CIC) 704*a*, 704*b* with random access and one or more CMAF non-initial chunks (CNC) 702*a*, 702*b*, 702*c*, and 702*d*. The CIC 704*a*, 704*b* can include media data contained at the beginning of a segment, and can be delivered as HTTP Chunks to the client. The CNC 702*a-d* can be delivered as HTTP Chunks for the same segment.

For example, the DASH Packager 700 can create the DASH Segments 720*a* and 720*b*, each containing the HTTP Chunks created from the media data received from the encoder. For example, in the DASH Segment 720*a*, the HTTP Chunks 722*a-c* include CNC 712*a-b* and CIC 714*a* corresponding to the CNC 702*a-b* and CIC 704*a* received from the encoder. Similarly, in the DASH Segment 720*b*, the HTTP Chunks 722*d-f* include CNC 712*c-d* and CIC 714*b* corresponding to the CNC 702*c-d* and CIC 704*b* received from the encoder. The Media Presentation Description (MPD) 724 can include a manifest (e.g., an extensible markup language (XML) document) including information about media segments, their relationships (e.g., the order of the media segments), other information client devices can use to choose between the media segments, and other metadata that may be needed by client devices. For example, the MPD 724 can include an address (e.g., uniform resource locations (URLs) or other types of addresses) for each media segment, and can also provide an address for the initialization segment (IS) 726. The IS 726 can include information needed to initialize the video decoder on the client device. In some cases, the IS 726 may not be present.

However, the conventional implementations of the DASH Packager 700 are not well suited for low latency optimizations which may be involved for delivery and presentation of sparse tracks. For example, each sample in a track of the HTTP Chunks transferred can have an associated decode time. The ISOBMFF specifies that the decode times are encoded as decode time deltas. For example, the decode time delta for a sample can include a variation (e.g., an increment) relative to a decode time of a previous sample. These decode time deltas can be included in metadata related to the samples. For example, the decode time deltas can be included in a Decoding Time to a Sample (stts) box of a fragment which contains the sample. The decode time deltas are specified in subclause 8.6.1.2.1 of ISOBMFF specification (e.g., ISO/IEC 14496-12) as:

$$DT(n+1)=DT(n)+STTS(n) \quad \text{Equation (1)}$$

where DT(n) is the decode time for a current sample "n" and STTS(n) includes a decode time delta to be added DT(n) to obtain the decode time DT(n+1) for a next sample "n+1".

Thus, the decode time deltas can be used to communicate the decode time difference between the current sample and the next sample to the player device. However, being able to encode the decode time delta STTS(n) in a current sample n requires knowing the decode time DT(n+1) of the following sample at the time of encoding the current sample, in order to determine the decode time delta relative STTS(n) to the decode time DT(n) of the current sample. While it is possible to know or determine the decode time of the following sample for typical media content, sparse media tracks pose challenges in this regard.

For example, referring back to FIG. 6, for example, the current sample can be the sample 640*a* of the fragment 630*a*, where the fragment 630*a* can be the current fragment. The next sample can be the sample 640*b* in the following fragment 630*b*. For typical media content, such as typical video and/or audio files, the durations for the samples are constant and/or known and/or determinable. If the duration of the sample 640*a* is known and the decode time for the fragment 630*a* is known, then the decode time for the fragment 630*b* and the sample 640*b* contained therein can be estimated or determinable. Thus, it is possible to obtain the decode time delta between the sample 640*a* and the sample 640*b* and encode the decode time delta in the sample 640*a* (or in the metadata of the fragment 630*a*). However, for sparse content, knowing the duration of the sample 640*a* and/or the decode time delta is not determinable, as will be discussed further with reference to FIG. 8 below.

Figure 8:
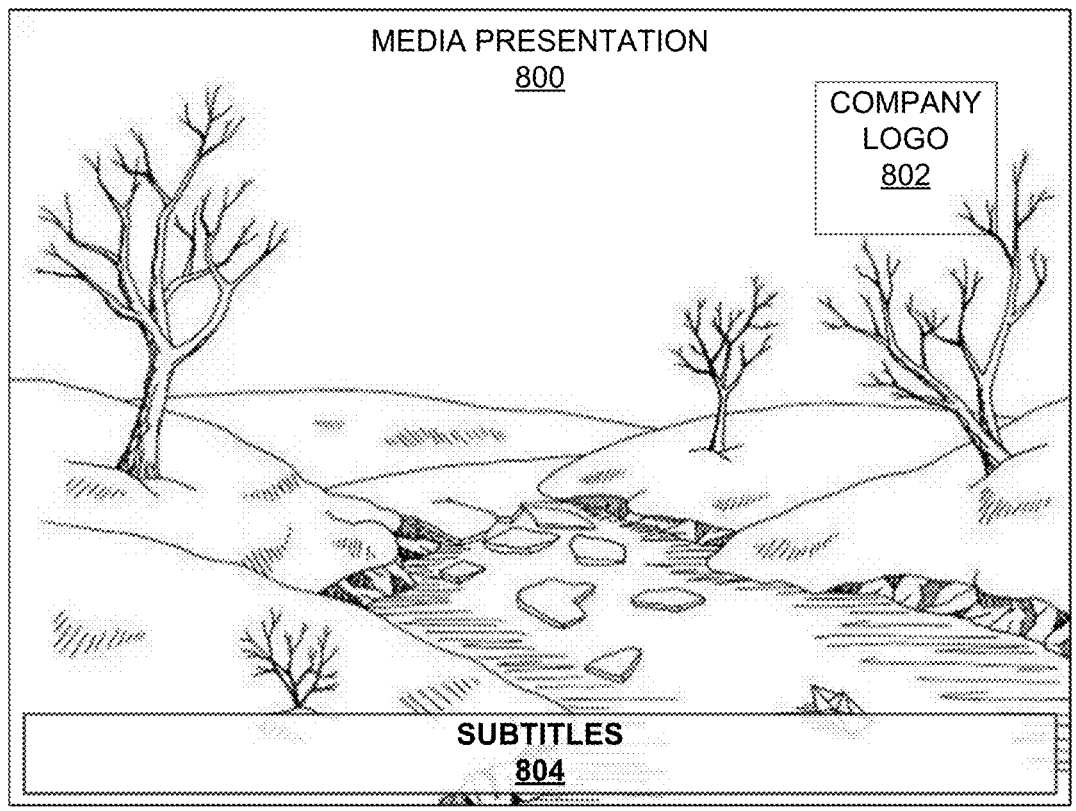
FIG. 8 is a diagram illustrating an example of a media presentation which includes sparse content, in accordance with some examples.

FIG. 8 is a diagram illustrating an example of a media presentation 800. The media presentation 800 may be presented in a player device, with a video component of a natural scene being rendered on the player device. The media presentation 800 can also include an audio component even though it has not been illustrated. The media presentation 800 can also include sparse content, such as a company logo 802 and subtitles 804. Other types of sparse content can include interactive graphics, audio content (such as an alert or alarm sounded for a varying duration, among others. A reference to typical media data in the media presentation 800 excludes the sparse content. For example, the typical media data can include the video and/or audio related to the scenery being presented, but not the company logo 802 or the subtitles 804. The sparse content can be overlaid on the media data in some examples, although this is not necessary.

The media data and the sparse content in the media presentation 800 can be provided to the player device in an ISO base media file format in some examples. In some examples, the media data can be packed by a DASH Packager and delivered as HTTP Chunks to the player device. In some examples, the media data can be encoded in samples, such as in the ISO base media files 400, 500, 600 of FIG. 4-FIG. 6. For example, the media data can be encoded in segments and further fragmented, with each fragment including one or more samples. For the typical media data containing audio and/or video content, the duration of each sample can be constant, as noted above, even though the content of each sample can vary.

However, for the sparse contents, the data can remain the same for a varying duration of time. For example, there may be an indefinite gap or period of silence in an audio track. In another example, there may be no need to update some sparse content such as interactive content, where an interactive screen may remain static for a variable period of time. In yet another example, there may be no need to update sparse content such as the subtitles 804 from one fragment to the next. Thus, for such sparse content, knowing the decode time of the first sample of a following fragment at the time of encoding a current fragment is a challenge.

To address the problem associated with delivering a low-latency presentation of sparse content, it may be desirable to provide an indication to the player device that the player device is to keep presenting the sparse content in a sample until the player device receives a new sample. However, there is currently no known mechanism in the ISOBMFF standard to communicate to the player device that the player device is to present a sample indefinitely. Without a sample duration included in the metadata of the sample, the player device would not know at the time of decoding the sample, how long to present the sample. If an estimated sample duration is assumed at the time of decoding the sample, there is a possibility that the estimated sample duration may still lapse before the new sample is received. For example, in the case of presenting the subtitle 804, the player device may stop presenting the subtitle 804 when the estimated sample duration lapses, and then may possibly resume presenting the same subtitle 804 when the new sample is received, if the current sample and the new sample include the same subtitle 804. This can lead to flickering and unnecessary processing load. On the other hand, the estimated sample duration can also be too long, such that an error occurs in presenting the sample for longer than required. There is also currently no known mechanism to instruct the player device to reduce the sample duration after the sample has been decoded.

One approach to addressing this challenge involves the use of a polling mechanism, where a resolution of time can be defined according to the type of media being presented. For example, the time resolution can be set as 100 milliseconds (ms) for sparse content such as interactive content. Empty samples can be sent at a frequency of one sample every 100 ms during periods of silence when there is no data for the interactive content to be presented. However, there is a significant overhead which is incurred in the file format of ISO base media format files encoded in this manner. For example, for large periods of time, encoding samples with no data and transmitting such empty samples for presentation at a player device can come with associated costs. Further, high quality content can place demands on higher accuracy or higher refresh (or update) rates, which means that for sparse content such as subtitles, the time resolution may need to be set to a much lower value to achieve desirable user experience. Otherwise, a lower update rate based on a larger time resolution can lead to a low accuracy presentation, leading to poor user experience.

Another approach can include setting a time in a next fragment, which can correspond to an accumulated decode time. This accumulated decode time may be set in a baseMediaDecodeTime of the next fragment, where the baseMediaDecodeTime may be included in metadata of a ISO base media format file. The sum of the durations of samples in a current fragment is calculated. If the accumulated decode time set in the baseMediaDecodeTime of the next fragment exceeds the sum of the durations of samples in the current fragment, then the duration of the last sample of the current fragment is extended. The extension of the duration of the last sample of the current fragment is designed to bring the sum of the durations of samples in the current fragment to be equal to the accumulated decode time set in the baseMediaDecodeTime of the next fragment. This way, it is possible to extend the time of current fragment when the decode time of the next fragment is not yet known.

In some examples, setting the accumulated decode time in the baseMediaDecodeTime of the next fragment can include setting the duration of a sample of the next fragment to a nominal value (e.g., the typical sample duration for the track included in the sample). For example, for video tracks, this sample duration can determined based on a frame rate of the video track. Subsequently, when the actual sample duration for that sample becomes known (e.g. when the next sample arrives), the duration is updated by using signaling included in the baseMediaDecodeTime box.

However, according to this approach, the current fragment may be encoded without the knowledge of the decode time of the next fragment. Since the player device or decoder does not have the information pertaining to the decode time of the next fragment while decoding a sample in the current fragment, the player device may stop presenting the sample in the current fragment after the sample's duration has lapsed. The ISOBMFF specification does not currently address this problem. Further, this approach can also suffer from a lack of signaling mechanisms in place to reduce the duration of a sample which is currently being presented.

Systems and methods are described herein that provide a solution to the problems described above. For example, the sample duration of a previous sample can be extended or reduced based on an indication or signaling provided in a current sample. The current sample can include a sample currently being processed, and the previous sample can include a sample received, decoded, and/or rendered by a client device prior to the current sample. The previous sample can include sparse content of unknown duration. A previous fragment which included the previous sample can include the sample duration of the previous sample, where the sample duration was set to a reasonable estimate. The previous sample can include a sparse track of unknown duration. In some examples, the reasonable estimate can be derived based on the type of the sparse content.

In some cases, the reasonable estimate can be based on empirical or statistical information regarding the duration of the type of the sparse content. In some examples, the reasonable estimate can include a nominal estimate (e.g., the typical sample duration for the track included in the sample). For example, for video tracks, this sample duration can determined based on a frame rate of the video track. Subsequently, when the actual sample duration for that sample becomes known (e.g. when the next sample arrives), the estimate can be updated by using signaling, such as signaling included in a baseMediaDecodeTime box. For example, subsequent to packaging the sample, when the exact sample duration becomes known (e.g. when the next sample arrives), the packager can include signaling to either reduce the signaled sample duration or to extend the signaled sample duration.

For example, upon decoding the current sample, a modified duration can be obtained, which can include the signaling for extending or reducing the sample duration of the previous sample. For example, if a current fragment which includes the current sample is decoded at a current time instance, the modified duration can be obtained from the current fragment. The modified duration can indicate a time duration by which the presentation of the previous sample is to be extended or reduced in relation to the current time instance. At least one media sample can be presented by the player device for a time duration based on the modified duration. For example, presenting the at least one media sample can include presenting the previous media sample for an extended duration or presenting a new media sample starting at the current time instance. In some examples, presenting the at least one media sample can include reducing the sample duration for presenting the previous media sample.

Figure 9:
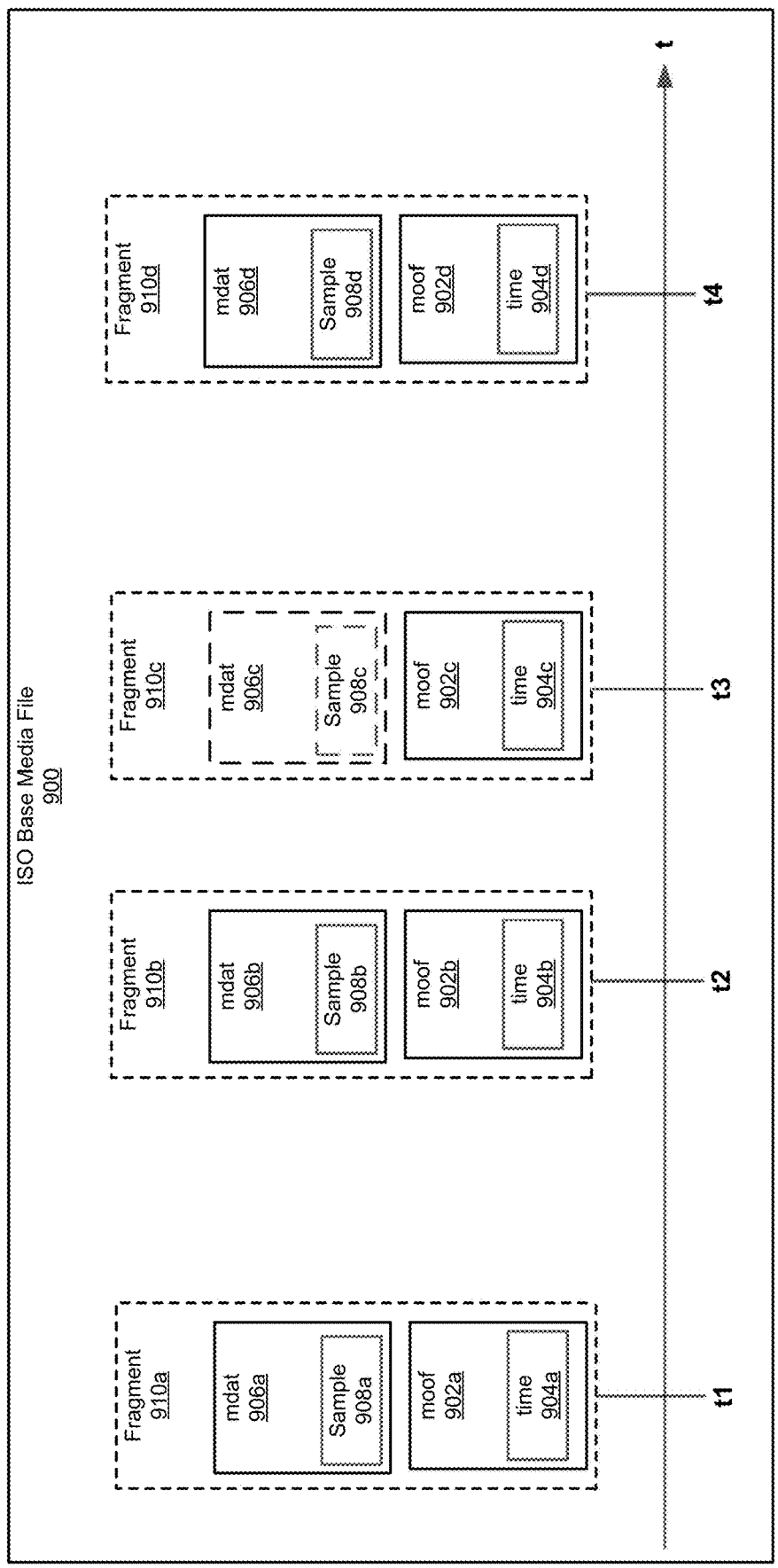
FIG. 9 is a diagram illustrating an example of processing media content for reducing the sample duration of sparse content, in accordance with some examples.

FIG. 9 is a diagram illustrating an example of an ISO base media file 900 formatted according to the ISOBMFF. The example ISO base media file 900 can include multiple fragments such as the fragments 910*a-d*. The fragments 910*a-d* can be encoded by a host device and decoded and presented by a player device. In some examples, the fragments 910*a-d* may not be ISOBMFF boxes, but rather describe movie fragment (moof) boxes 902*a-d* and media data (mdat) boxes 906*a-d* that are referenced by the moof boxes 902*a-d*, respectively.

The moof boxes 902*a-d* can extend a presentation, such that the presentation can be built incrementally. The moof boxes 902*a-d* can each include additional fields such as a movie fragment header box, a track fragment box, as well as other boxes not illustrated here. The moof boxes 902*a-d* are shown to include respective time boxes 904*a-d*. The time boxes 904*a-d* can each contain one or more time structures or values pertaining to absolute times, relative times, time durations, etc.

In one example, one or more of the time boxes 904*a-d* can contain a TimeToSampleBox. In some examples, the TimeToSampleBox can include a sample duration. A sample duration is a duration (also referred to as a "delta") in the TimeToSampleBox. The sample duration for a track can refer to the duration of the sample in the track. Tracks can include a sequence of samples in decoding order. Each sample can have a decoding time that is computed by adding to the previous sample's decoding time, the previous sample's duration (as given by the values in the TimeToSampleBox or the equivalent field in movie fragments). The decoding time of the first sample in a track or fragment can be defined as being at time zero. This forms the decoding timeline of a track. In some examples, the sample duration for a sample in a fragment can be modified based on modification information contained in a subsequent fragment. For example, the modification information may be obtained from a track fragment decode time (tfdt) contained in the subsequent fragment.

In some examples, one or more of the time boxes 904*a-d* can also contain a tfdt box with one or more tfdt values. An example tfdt value, which may be used for signaling the modification information, can include an absolute decode time or a baseMediaDecodeTime. The baseMediaDecodeTime is an integer equal to the sum of the decode durations of all earlier samples in the media, expressed in the media's timescale. In some examples, the tfdt box can include an absolute decode time, measured on the decoding timeline, of the first sample in decoding order in the track fragment. The absolute decode time can be useful, for example, when performing random access in a file. For example, in the case of a random access, it is not necessary to sum the sample durations of all preceding samples in previous fragments to find the decode time for first sample in the fragment if the absolute decode time is known. In an example where a fragment contains a single sample, the baseMediaDecodeTime or absolute decode time provided by the tfdt can provide the decode time for the sample. In some examples, one or more of the time boxes 904*a-d* can include a TrackFragmentBaseMediaDecodeTimeBox, where the tfdt box may be present within a TrackFragmentBox container of the TrackFragmentBaseMediaDecodeTimeBox.

The mdat boxes 906*a-d* can contain media data, e.g., included in respective samples 908*a-d*. In video tracks, the media data can include video frames, access units, NAL units, and/or other form of video data. The media can alternatively or additionally include audio data. A presentation can include zero or more media data boxes, contained in one or more individual files. In some examples, the media data in one or more of the samples 908*a-d* can include sparse data such as the company logo 802, the subtitles 804, and/or any other type of sparse content.

Although not illustrated, the ISO base media file 900 can include one or more segments, each segment with one or more fragments. Each of the fragments can include a single media sample or, in some cases, more than one sample with known durations can precede each fragment. In the example shown, fragments 910*a-d* are illustrated with a single sample per fragment. Each fragment has a respective one of the moof boxes 902*a-d* and mdat boxes 906*a-d* (e.g., fragment 910*a* has mdat box 906*a* and moof box 902*a*, fragment 910*b* has mdat box 906*b* and moof box 902*b*, and so on). The fragments 910*a-d* can be decoded at times t1-t4, respectively (e.g., fragment 910*a* can be decoded at time t1, fragment 910*b* can be decoded at time t2, and so on), by a player device.

In an example, the fragment 910*a* with the sample 908*a*, decoded at time t1, can include media data such as a typical media data (the video and/or audio related to the scenery being presented) or sparse data. In an example, the sample duration of the sample 908*a* can be modified or may remain unmodified. Similarly, the fragment 910*d* with the sample 908*d*, decoded at time t4, can include media data such as typical media data or sparse data. In an example, the sample duration of the sample 1008*a* can be modified or may remain unmodified. The presentations of the sample 908*a* and 908*d* can be based on the sample duration or other time information obtained from the respective time boxes 904*a* and 908*d*.

In an example, the duration of the sample 908*b* decoded at time t2 can be modified. For the sake of illustration of an example aspect, the fragment 910*b* can be referred to as a previous fragment, and the sample 908*b* therein can be referred to as a previous sample. The sample 908*b* can include sparse data, such as data associated with a subtitle, an interactive graphic (e.g., a logo), or other sparse data.

According to an example aspect, the fragment 910*b* can have a sample duration associated with the sample 908*b*. This sample duration can be set to a reasonable duration based on an estimate. The estimate of the reasonable duration can be based on the type of sparse data and/or other factors. It may be desirable to modify the duration of presenting the sample 908*b* as needed. In one example, a dynamic need can arise to reduce a fragment duration for content insertion after the decode time t2 of the previous fragment (fragment 910*b*). For example, a need may arise to insert third party content (e.g., an advertisement, product information, or other data) at time t3 following the time t2. If the sample duration (set to the reasonable duration) is greater than t3–t2 (in which case the presentation of the previous sample can extend beyond the time t3), then the sample duration of the previous sample can be reduced. For example, reducing the sample duration of the previous sample can prevent the previous sample from being presented beyond the time t3.

As noted above, the sample duration of the previous sample (sample 908*b*) can be modified to reduce the sample duration. In one illustrative example, to reduce the signaled sample duration (e.g., in the time box 904*b* of the previous sample), a new fragment can be provided with modification information. For instance, the new fragment can include the fragment 910*c* with a decode time of t3. The fragment 910*c* is referred to as a current fragment to illustrate an example aspect. The current fragment (fragment 910*c*) can include a current time component in the time box 910*c*.

In one illustrative example, the current time component can be a tfdt which includes an update decode time or a modified decode time signaled by a baseMediaDecodeTime field. In an example, the tfdt for the current fragment (fragment 910*c*) can be encoded or set to t3. In some examples, the fragment 910*c* need not include a sample. The mdat box 906*c* and the sample 908*c* contained therein are shown in dashed boxes to indicate that their inclusion in the fragment 910*c* is optional. The fragment 910*c* can be referred to as an empty fragment if it does not contain any sample data. Regardless of whether sample data is present or not in a current fragment (fragment 910*c*), the decoder or player device can modify the sample duration of the previous sample based on the tfdt value t3. For example, the player device can update the sample duration of the previous sample (sample 910*b*) from the reasonable duration, which was set at time t2, to a modified duration. In some cases, the modified duration can correspond to t3–t2. Accordingly, the modified duration can reduce the sample duration of the previous sample from extending beyond t3.

In some examples, there may also be a need to extend the sample duration of a previous sample. As will be explained further with reference to FIG. 10, a modified duration can be signaled in a subsequent fragment (or current fragment) to extend the duration of a previous sample. In some examples, the current fragment can include the same data which was contained in the previous sample to affect the extension. Thus, the current fragment can include a current sample which is referred to as a redundant sample which carries the same data as the previous sample. The current fragment can include a field or box with sample_has_redundancy set to 1, or can include any other suitable value or mechanism which indicates that the current sample is a redundant sample. The current fragment can be sent at a time instance when the previous sample is to be extended. For example, an extension of this nature may be desirable when a packager (e.g., the DASH Packager 700) needs to start and send a new segment but there is no new sample to be sent.

Figure 10:
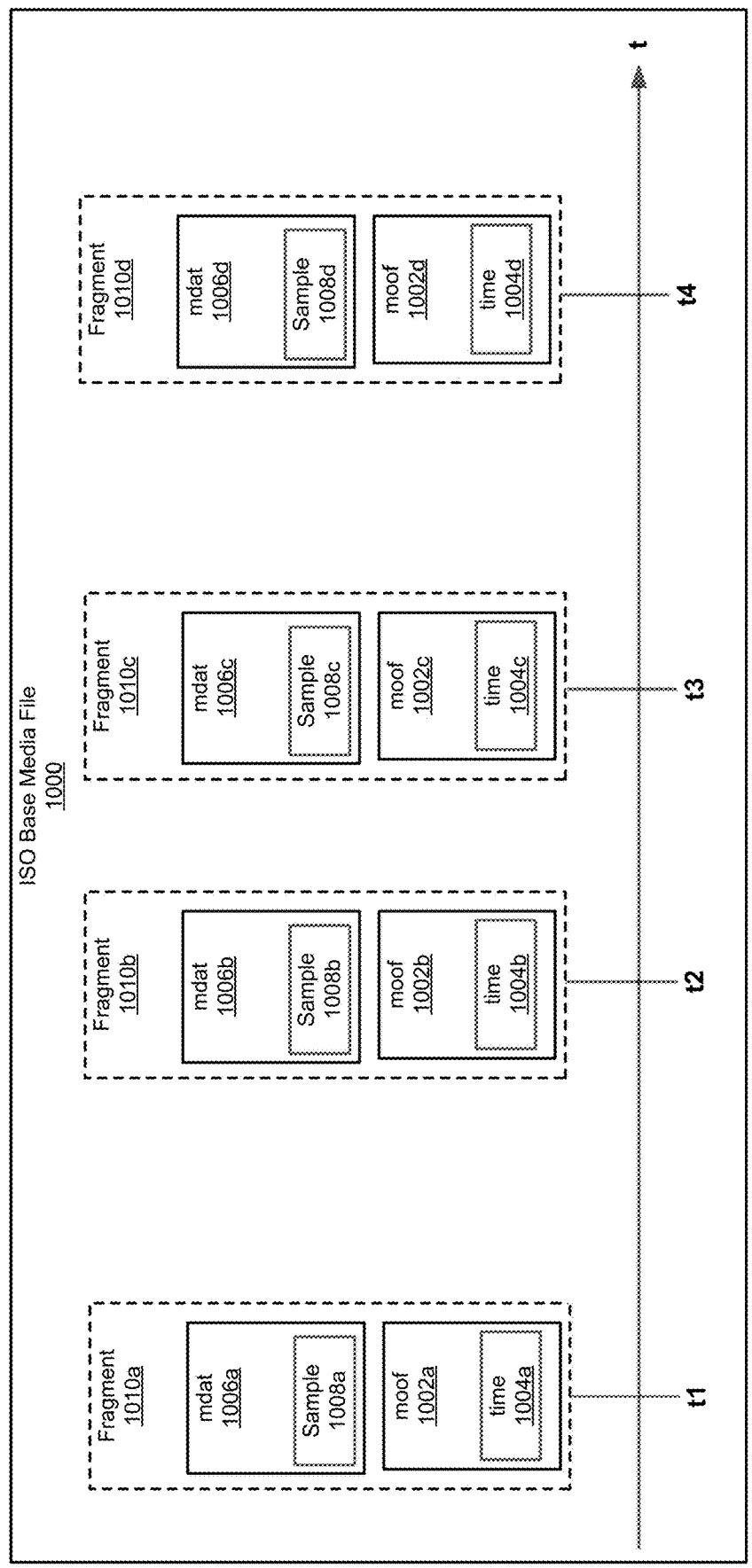
FIG. 10 is a diagram illustrating an example of processing media content for extending the sample duration of sparse content, in accordance with some examples.

FIG. 10 is a diagram illustrating an example of an ISO base media file 1000 formatted according to the ISOBMFF. The ISO base media file 1000 is similar in some aspects to the ISO base media file 900 of FIG. 9, and as such the following discussion will be more focused on the distinctions of the ISO base media file 1000 from the ISO base media file 900. The ISO base media file 1000 can also include multiple fragments such as the fragments 1010*a*-1010*d*, described by the movie fragment (moof) boxes 1002*a*-1002*d* and media data (mdat) boxes 1006*a*-1006*d* that are referenced by the moof boxes 1002*a*-1002*d*, respectively.

The moof boxes 1002*a*-1002*d* are shown to include respective time boxes 1004*a*-1004*d*. The time boxes 1004*a*-1004*d* can each contain one or more time structures or values pertaining to absolute times, relative times, time durations, etc. In some examples, one or more of the time boxes 1004*a*-1004*d* can contain a sample duration. In some examples, one or more of the time boxes 1004*a*-1004*d* can also contain a tfdt box with one or more tfdt values. An example tfdt value which may be used for signaling modification information can include an absolute decode time or a baseMediaDecodeTime.

The mdat boxes 1006*a*-1006*d* can contain media data, e.g., included in respective samples 1008*a*-1008*d*. In some examples, the media data in one or more of the samples 1008*a*-1008*d* can include sparse data such as the company logo 802 and/or the subtitles 804 from FIG. 8, and/or any other type of sparse content.

Although not illustrated, the ISO base media file 1000 can include one or more segments, each segment with one or more fragments. In the example shown, fragments 1010*a*-1010*d* are illustrated, each with a respective one of the moof boxes 1002*a*-1002*d* and mdat boxes 1006*a*-1006*d*. The fragments 1010*a*-1010*d* can be decoded at times t1-t4, respectively, by a player device.

In an example, the fragment 1010*a* with the sample 1008*a*, decoded at time t1, can include media data such as a typical media data (the video and/or audio related to the scenery being presented) or sparse data. In an example, the sample duration of the sample 1008*a* can be modified or can remain unmodified. The presentation of the sample 1008*a* can be based on the sample duration or other time information obtained from the time box 1004*a*.

In an example, the duration of the sample 1008*b* decoded at time t2 can be modified. For the sake of illustration of an example aspect, the fragment 1010*b* can be referred to as a previous fragment, and the sample 1008*b* therein can be referred to as a previous sample. The sample 1008*b* can include sparse data.

According to an example aspect, the fragment 1010*b* can have a sample duration associated with the sample 1008*b*. This sample duration can be set to a reasonable duration based on an estimate. The estimate of the reasonable duration can be based on the type of sparse data and/or other factors. In an example, the reasonable estimate can include a duration from the time t2 extending until a following time t3. It may be desirable to modify the duration of presenting the sample 1008*b* as needed. In an example, the sample duration of the sample 1008*b* may be modified to be extended from the time t3 to a time t4 which follows the time t3. For example, as previously mentioned, a packager (e.g., the DASH Packager 700) may require such an extension in the duration of the previous sample contained in a previous segment, when a subsequent, new segment to be sent does not yet have sample data. Extending the duration of the previous segment in this manner can allow a continuous flow to be maintained until the new segment's data becomes available. In an example, the sample duration of the previous sample (sample 1008*b*) can be modified as described below.

In one illustrative example, the sample duration of the previous sample (sample 1008*b*) can be modified to increase the sample duration. For example, to increase the sample duration of the previous sample to extend past time t3, a new fragment can be provided with modification information. In an example, the new fragment can include the fragment 1010*c* with a decode time of t3. The fragment 1010*c* is referred to as a current fragment to illustrate an example aspect where the fragment 1010*c* is currently being processed. As previously mentioned, the current fragment (fragment 1010*c*) can also include a redundant sample whose sample data matches or repeats the data in the previous sample (sample 1010*b*). The current fragment (fragment 1010*c*) can also include a field or box (not shown) with sample_has_redundancy set to 1, or can include any other suitable value or mechanism which indicates that the current sample is a redundant sample.

The current fragment (fragment 1010*c*) can also include a current time component in the time box 1010*c*. In an example, the current time component can be a tfdt which includes an update decode time or a modified decode time signaled by a baseMediaDecodeTime field. In an example, the tfdt for the current fragment (fragment 1010*c*) can be set to t4.

At time t3, the player device or decoder can ignore the redundant sample (sample 1010*c*) for the purposes of decoding and presentation, based, for example, on the sample_has_redundancy field set to 1. The player device or decoder can also extend the sample duration of the previous sample from the initial value or reasonable estimate set to t3−t2, to an extended duration. The extended duration can include a duration from the time t3 to the time t4 contained in the tfdt field of the current fragment 1010*c*. Based on the extension, the duration of the previous sample can thus be modified to t4−t2. The use of the redundant sample and the player device ignoring the redundant sample for the purposes of decoding and presentation can allow the continuous, uninterrupted presentation of the previous sample.

In some examples, another player device can start receiving samples at the time t3 after the time t2. Based on the fragment 1010*c* received at the time t3, this other player device can also decode and present the sample contained in the fragment 1010*c* from the time t3 to the time t4. For example, this other player device can ignore the sample_has_redundancy field being set to 1 because this other player device did not receive samples prior to the time t3, and therefore did not receive the previous sample (sample 1008*b*). However, since the data in the sample 1008*c* is the same as the data in the sample 1008*b*, the other player device can decode the sample 1008*c* at the time t3, and present the sample 1008*c* (the same as the previous sample) for the extension duration from t3 to t4.

In some cases, exception values can be used for low-latency presentation of sparse content. For example, an exception value can be defined for the sample duration of media samples containing sparse content or content whose sample duration is unknown. The exception value can be included in a fragment which includes such media samples. Upon encountering this exception value as a sample duration of any media sample, the decoder or player device can present the media sample until the presentation time of a next media sample. One example of an exception value can be a 0. Another example of an exception value can be all 1s.

The absolute decode time of the next media sample can then be signaled using a media decode time box (e.g., using the tftd box or using the baseMediaDecodeTime value thereof). The presentation time for the next media sample can be based on a composition offset, where the composition offset can include a sample-by-sample mapping of the decode-to-presentation time. In some cases, a composition offset can be provided in a Composition Time to Sample Box ('ctts').

In addition, it is desirable to provide the ability at the end of a file or representation to signal the termination of the rendering and the end of a media item (e.g., a movie, a show, or other media item). Signaling the termination of the presentation and the end of a media item can be implemented using yet another exception. Such an exception can be referred to as an end-of-file exception. In one illustrative example, such an exception can be implemented by sending a moof with a sample duration (e.g., with a sample duration only), and setting the sample duration to 0 in order to signal that this is the end of a media file. For example, the end-of-file exception can indicate that the sample is the end of a media file.

At the end of a segment, it may be even more difficult for presenting sparse content because of requirements of the segment boundary to avoid causing a sample duration end. Another exception signal may be provided, namely to signal the end of the segment, but that presenting samples of the segment are to be stopped only if an instruction does not follow immediately that the termination of the presentation is canceled again. Such an exception can be referred to as an end-of-segment exception.

Figure 11:
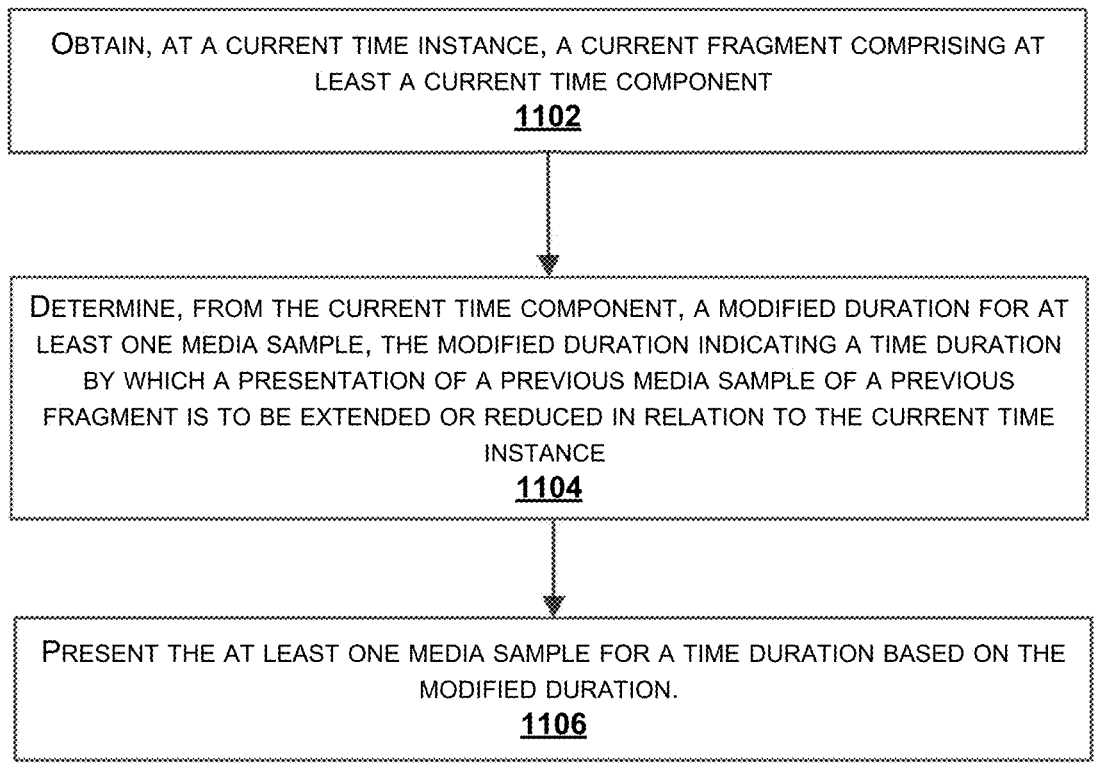
FIG. 11 is a flowchart illustrating an example of a process of processing media content, in accordance with some examples.

FIG. 11 is a flowchart illustrating an example of a process 1100 of processing media content as described herein. In some examples, the process 1100 can be performed at a decoder (e.g., the decoding device 112 of FIG. 1 or FIG. 14) or a player device (e.g., the video destination device 122).

At 1102, the process 1100 includes obtaining, at a current time instance, a current fragment comprising at least a current time component. For example, at time t3, the fragment 910*c* of FIG. 9 can be obtained by the player device, wherein the fragment 910*c* can include the time 904*c*. In another example, the fragment 1010c of FIG. 10 can be obtained by the player device, wherein the fragment 1010c can include the time 1004c.

At 1104, the process 1100 includes determining, from the current time component, a modified duration for at least one media sample, the modified duration indicating a time duration by which a presentation of a previous media sample of a previous fragment is to be extended or reduced in relation to the current time instance. In some examples, the previous fragment can include a sample duration for presenting the previous media sample, where the sample duration may have been set to a predetermined reasonable duration.

For example, the player device can determine from a baseMediaDecodeTime or decode time contained in a tftd field in the time 904c, the time t3. The time t3 can correspond to the current time instance. The player device can determine that a sample duration of a previous media sample, the sample 908b, contained in a previous fragment, the fragment 910b, is to be reduced in relation to the current time instance. For example, the sample duration of the sample 908b, as indicated in a sample duration field in the time box 904b of the previous fragment 910b can extend past the time t3. Based on the time t3 contained in the current time component, the player device can determine a modified duration indicating a time duration by which the sample duration of the previous sample is to be reduced. The modified duration can include reducing the sample duration from extending past the time t3, to bring the sample duration of the previous sample to t3–t2.

In some examples, the current fragment can be an empty fragment without media sample data. For example, the fragment 910c may not include the mdat box 906c or the sample 908c which are shown as optional fields in FIG. 9.

In another example, the player device can determine from a baseMediaDecodeTime or decode time contained in a tftd field in the time 1004c, the time t4. The player device can determine that a sample duration of a previous media sample, the sample 1008b, contained in a previous fragment, the fragment 1010b, is to be extended in relation to the current time instance t3. For example, the sample duration of the sample 1008b, as indicated in a sample duration field in the time box 1004b of the previous fragment 1010b can be extended past the time t3 to the time t4. Based on the time t4 contained in the current time component, the player device can determine a modified duration indicating a time duration by which the sample duration of the previous sample is to be extended. The modified duration can include extending the sample duration from the time t3 to the time t4, to bring the sample duration of the previous sample to t4–t2.

In some examples, the current fragment can include a redundant media sample, where the redundant media sample matches the previous media sample. For example, the sample 1008c can match or contain the same sample data as the sample 1008b in FIG. 10. Moreover, in some examples, the current fragment can include a redundant media sample field, the redundant media sample field for providing an indication of the redundant media sample. For example, the fragment 1010c can include a field such as a sample_has_redundancy whose value is set to 1 to indicate that the sample 1008c is a redundant sample.

At 1106, the process 1100 includes presenting the at least one media sample for a time duration based on the modified duration. For example, the player device can present the sample 908b for a duration reduced from the sample duration by a reduction duration. For example, the player device can present the sample 908b for the time duration t3–t2. In another example, the player device can present the sample 1008b for a duration extended from the sample duration by an extension duration. For example, the player device can present the sample 1008b for the time duration t4–t2. In some examples, the player device can present a new media sample starting at the current time instance t3 for the extension duration t4–t3.

In some examples, the at least one media sample presented by the player device can include sparse content, where a duration for presenting the sparse content is not known at a previous time instance when the previous fragment is decoded. For example, the samples 908b and/or 1008b can include sparse content such as the company logo 802 or the subtitles 804 shown in FIG. 8. The duration for presenting the sparse content may not be known by the player device at the previous time instance t2 that the fragment 910b or 1010b was decoded.

Figure 12:
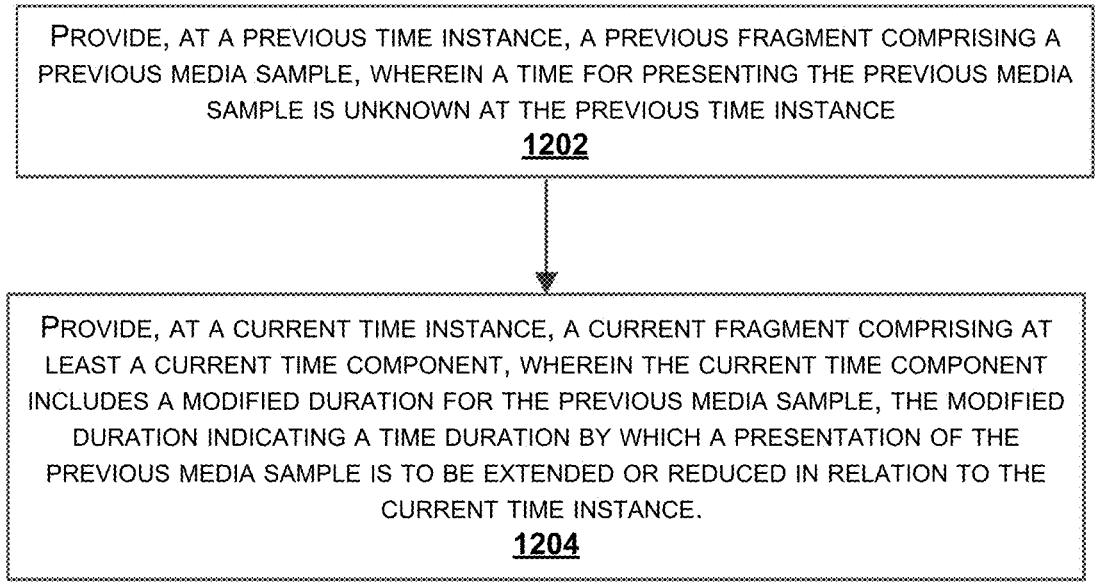
FIG. 12 is a flowchart illustrating an example of a process of providing media content, in accordance with some examples.

FIG. 12 is a flowchart illustrating an example of a process 1200 of providing media content as described herein. In some examples, the process 1200 can be performed at an encoder (e.g., the decoding device 104 of FIG. 1 or FIG. 13).

At 1202, the process 1200 includes providing, at a previous time instance, a previous fragment comprising a previous media sample, wherein a duration for presenting the previous media sample is unknown at the previous time instance.

For example, at the time instance t2 shown in FIG. 9, the fragment 910b including the sample 908b can be provided to a decoder or player device. At the time instance t2, the time duration for presenting the sample 908b may not be known. The sample 908b can include sparse content and the time duration may be set to a reasonable duration for sparse content at the time instance t2.

Similarly in another example, at the time instance t2 shown in FIG. 10 the fragment 1010b including the sample 908b can be provided to a decoder or player device. At the time instance t2, the time duration for presenting the sample 1008b may not be known. The sample 1008b can include sparse content and the time duration may be set to a reasonable duration for sparse content at the time instance t2.

At 1204, the process 1200 includes providing, at a current time instance, a current fragment comprising at least a current time component, wherein the current time component includes a modified duration for the previous media sample, the modified duration indicating a time duration by which a presentation of the previous media sample is to be extended or reduced in relation to the current time instance.

For example, at the time instance t3 shown in FIG. 9, the fragment 910c including a time box 904c can be provided to the decoder or player device. The time box 904c can include a time t3, which can indicate that the time for presenting the sample 908b is to be reduced to a duration which does not extend beyond the time instance t3.

In another example, at the time instance t3 shown in FIG. 10, the fragment 1010c including a time box 1004c can be provided to the decoder or player device. The time box 1004c can include a time t4, which can indicate that the time for presenting the sample 1008b is to be extended to a duration extends beyond the time instance t3 to the time instance t4.

In some implementations, the processes (or methods) described herein can be performed by a computing device or an apparatus, such as the system 100 shown in FIG. 1. For example, the processes can be performed by the encoding device 104 shown in FIG. 1 and FIG. 13, by another video source-side device or video transmission device, by the decoding device 112 shown in FIG. 1 and FIG. 14, and/or by another client-side device, such as a player device, a display, or any other client-side device. In some cases, the computing device or apparatus may include a processor, microprocessor, microcomputer, or other component of a device that is configured to carry out the steps of the processes described herein. In some examples, the computing device or apparatus may include a camera configured to capture video data (e.g., a video sequence) including video frames. In some examples, a camera or other capture device that captures the video data is separate from the computing device, in which case the computing device receives or obtains the captured video data. The computing device may further include a network interface configured to communicate the video data. The network interface may be configured to communicate Internet Protocol (IP) based data or other type of data. In some examples, the computing device or apparatus may include a display for displaying output video content, such as samples of pictures of a video bitstream.

The components of the computing device (e.g., the one or more processors, one or more microprocessors, one or more microcomputers, and/or other component) can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes can be described with respect to logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

The coding techniques discussed herein may be implemented in an example video encoding and decoding system (e.g., system 100). In some examples, a system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above is merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device. Various embodiments of the application have been described.

Figure 13:
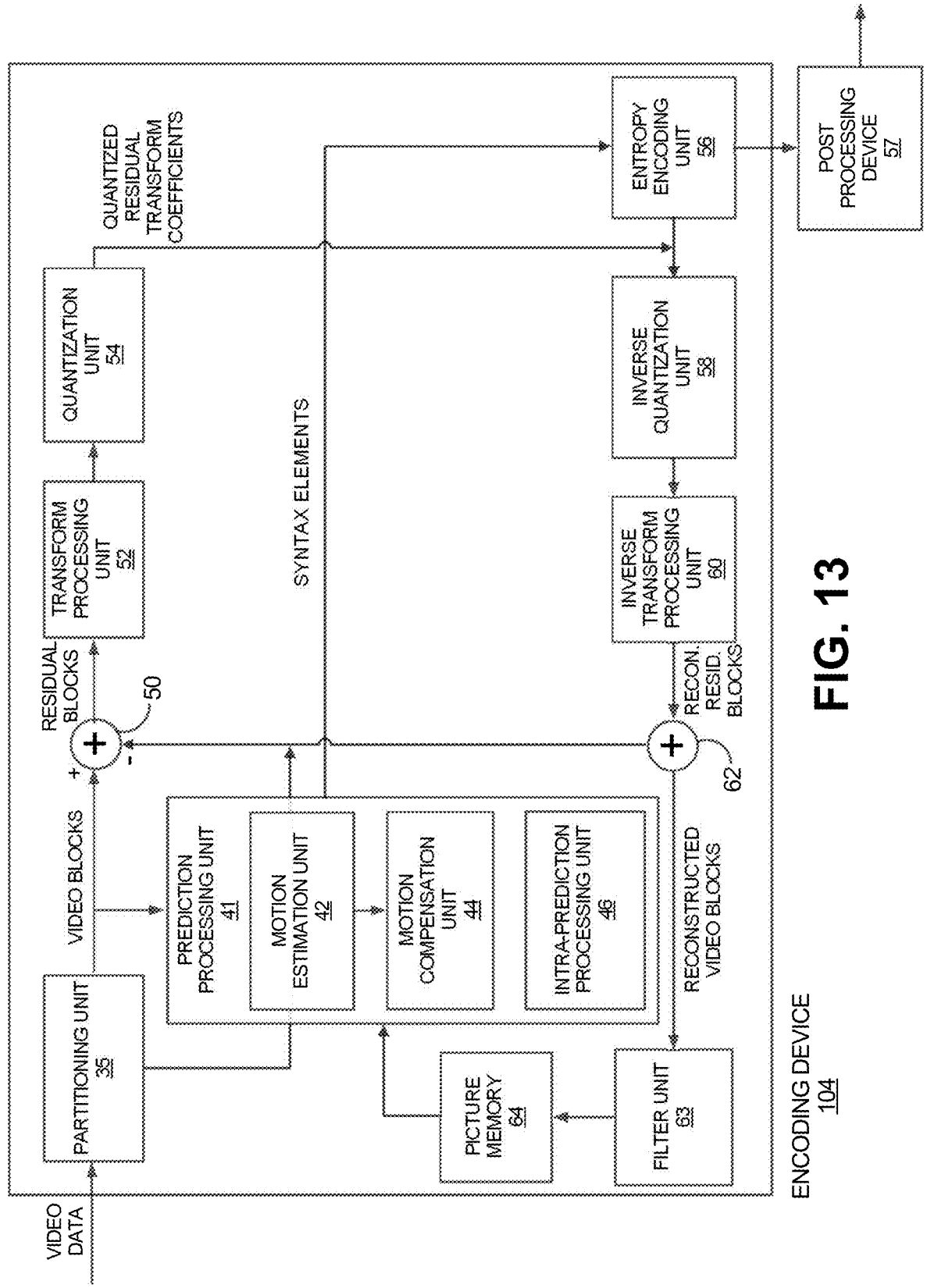
FIG. 13 is a block diagram illustrating an example video encoding device, in accordance with some examples.
Figure 14:
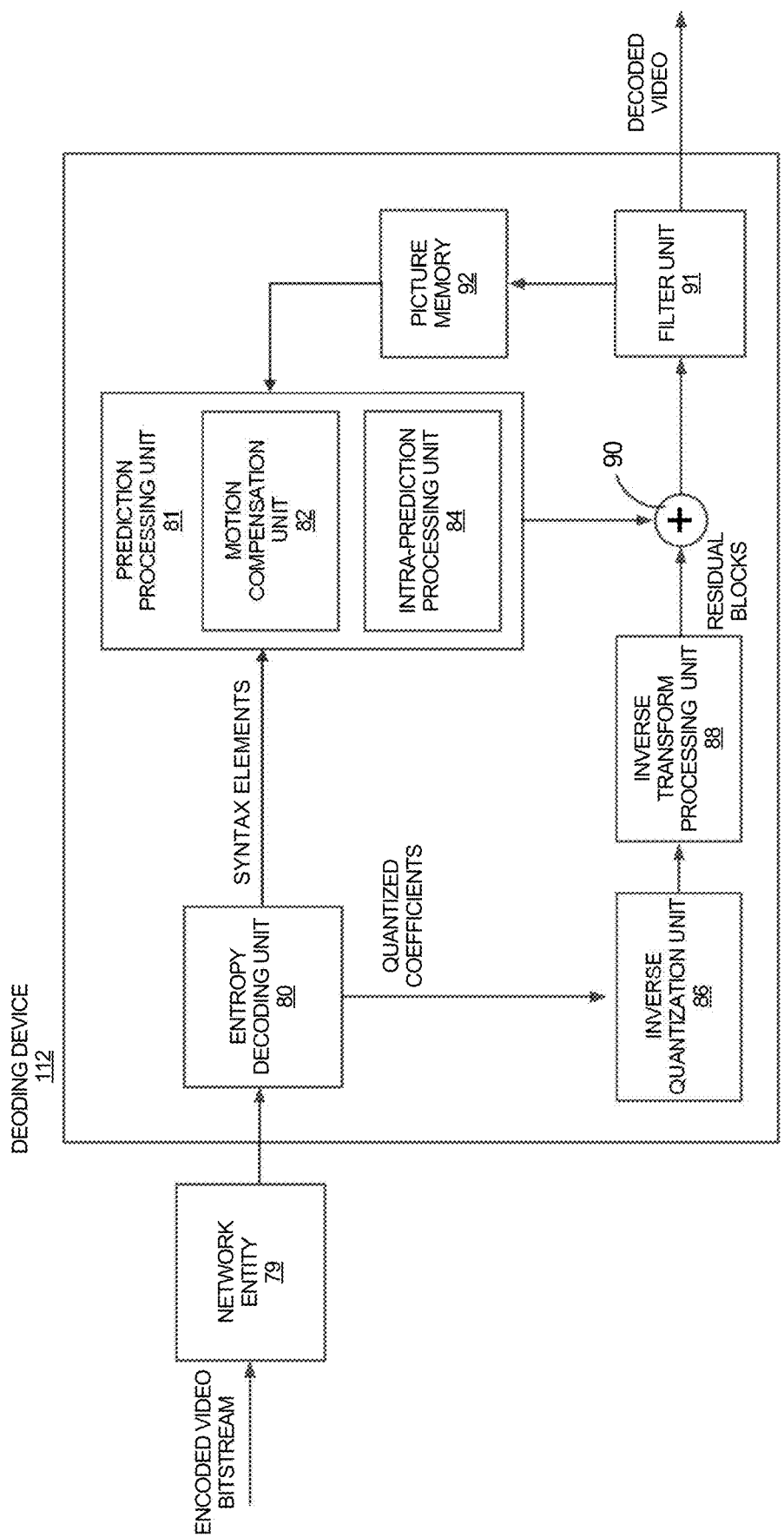
FIG. 14 is a block diagram illustrating an example video decoding device, in accordance with some examples.

Specific details of the encoding device 104 and the decoding device 112 are shown in FIG. 13 and FIG. 14, respectively. FIG. 13 is a block diagram illustrating an example encoding device 104 that may implement one or more of the techniques described in this disclosure. Encoding device 104 may, for example, generate the syntax structures described herein (e.g., the syntax structures of a VPS, SPS, PPS, or other syntax elements). Encoding device 104 may perform intra-prediction and inter-prediction coding of video blocks within video slices. As previously described, intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode), may refer to any of several temporal-based compression modes.

The encoding device 104 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, encoding device 104 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 13 as being an in loop filter, in other configurations, filter unit 63 may be implemented as a post loop filter. A post processing device 57 may perform additional processing on encoded video data generated by the encoding device 104. The techniques of this disclosure may in some instances be implemented by the encoding device 104. In other instances, however, one or more of the techniques of this disclosure may be implemented by post processing device 57.

As shown in FIG. 13, the encoding device 104 receives video data, and partitioning unit 35 partitions the data into video blocks. The partitioning may also include partitioning into slices, slice segments, tiles, or other larger units, as wells as video block partitioning, e.g., according to a quadtree structure of LCUs and CUs. The ncoding device 104 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra-prediction coding modes or one of a plurality of inter-prediction coding modes, for the current video block based on error results (e.g., coding rate and the level of distortion, or the like). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-prediction coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices, or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference (or image sample difference), which may be determined by sum of absolute difference (SAD), sum of square difference (SSD), or other difference metrics. In some examples, the encoding device 104 may calculate values for sub-integer pixel positions of reference pictures stored in picture memory 64. For example, the encoding device 104 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in a reference picture list. The encoding device 104 forms a residual video block by subtracting pixel values (or image sample values) of the predictive block from the pixel values of the current video block being coded, forming pixel difference values (or image sample difference values). The pixel difference values (or image sample difference values) form residual data for the block, and may include both luma and chroma difference components. Summer 50 represents the component or components that perform this subtraction operation. Motion compensation unit 44 may also generate syntax elements associated with the video blocks and the video slice for use by the decoding device 112 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction unit processing 46 may select an appropriate intra-prediction mode to use from the tested modes. For example, intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. The encoding device 104 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include a plurality of intra-prediction mode index tables and a plurality of modified intra-prediction mode index tables (also referred to as codeword mapping tables).

After prediction processing unit 41 generates the predictive block for the current video block via either inter-prediction or intra-prediction, the encoding device 104 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by entropy encoding unit 56, the encoded bitstream may be transmitted to the decoding device 112, or archived for later transmission or retrieval by the decoding device 112. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within a reference picture list. Motion compensation unit 44 may also apply one or more interpolation filters to the reconstructed residual block to calculate sub-integer pixel values (or image sample values) for use in motion estimation. Summer 62 adds the reconstructed residual block to the motion compensated prediction block produced by motion compensation unit 44 to produce a reference block for storage in picture memory 64. The reference block may be used by motion estimation unit 42 and motion compensation unit 44 as a reference block to inter-predict a block in a subsequent video frame or picture.

In this manner, the encoding device 104 of FIG. 13 represents an example of a video encoder configured to derive LIC parameters, adaptively determine sizes of templates, and/or adaptively select weights. The encoding device 104 may, for example, derive LIC parameters, adaptively determine sizes of templates, and/or adaptively select weights sets as described above. For instance, the encoding device 104 may perform any of the techniques described herein, including the processes described above with respect to FIGS. 16, 17, and 18. In some cases, some of the techniques of this disclosure may also be implemented by post processing device 57.

FIG. 14 is a block diagram illustrating an example decoding device 112. The decoding device 112 includes an entropy decoding unit 80, prediction processing unit 81, inverse quantization unit 86, inverse transform processing unit 88, summer 90, filter unit 91, and picture memory 92. Prediction processing unit 81 includes motion compensation unit 82 and intra prediction processing unit 84. The decoding device 112 may, in some examples, perform a decoding pass generally reciprocal to the encoding pass described with respect to the encoding device 104 from FIG. 13.

During the decoding process, the decoding device 112 receives an encoded video bitstream that represents video blocks of an encoded video slice and associated syntax elements sent by the encoding device 104. In some embodiments, the decoding device 112 may receive the encoded video bitstream from the encoding device 104. In some embodiments, the decoding device 112 may receive the encoded video bitstream from a network entity 79, such as a server, a media-aware network element (MANE), a video editor/splicer, or other such device configured to implement one or more of the techniques described above. Network entity 79 may or may not include the encoding device 104. Some of the techniques described in this disclosure may be implemented by network entity 79 prior to network entity 79 transmitting the encoded video bitstream to the decoding device 112. In some video decoding systems, network entity 79 and the decoding device 112 may be parts of separate devices, while in other instances, the functionality described with respect to network entity 79 may be performed by the same device that comprises the decoding device 112.

The entropy decoding unit 80 of the decoding device 112 entropy decodes the bitstream to generate quantized coefficients, motion vectors, and other syntax elements. Entropy decoding unit 80 forwards the motion vectors and other syntax elements to prediction processing unit 81. The decoding device 112 may receive the syntax elements at the video slice level and/or the video block level. Entropy decoding unit 80 may process and parse both fixed-length syntax elements and variable-length syntax elements in or more parameter sets, such as a VPS, SPS, and PPS.

When the video slice is coded as an intra-coded (I) slice, intra prediction processing unit 84 of prediction processing unit 81 may generate prediction data for a video block of the current video slice based on a signaled intra-prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within a reference picture list. The decoding device 112 may construct the reference frame lists, List 0 and List 1, using default construction techniques based on reference pictures stored in picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by the encoding device 104 during encoding of the video blocks to calculate interpolated values for sub-integer pixels of reference blocks. In this case, motion compensation unit 82 may determine the interpolation filters used by the encoding device 104 from the received syntax elements, and may use the interpolation filters to produce predictive blocks.

Inverse quantization unit 86 inverse quantizes, or dequantizes, the quantized transform coefficients provided in the bitstream and decoded by entropy decoding unit 80. The inverse quantization process may include use of a quantization parameter calculated by the encoding device 104 for each video block in the video slice to determine a degree of quantization and, likewise, a degree of inverse quantization that should be applied. Inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, the decoding device 112 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or to otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 14 as being an in loop filter, in other configurations, filter unit 91 may be implemented as a post loop filter. The decoded video blocks in a given frame or picture are then stored in picture memory 92, which stores reference pictures used for subsequent motion compensation. Picture memory 92 also stores decoded video for later presentation on a display device, such as video destination device 122 shown in FIG. 1.

In this manner, the decoding device 112 of FIG. 14 represents an example of a video decoder configured to derive LIC parameters, adaptively determine sizes of templates, and/or adaptively select weights. The decoding device 112 may, for example, derive LIC parameters, adaptively determine sizes of templates, and/or adaptively select weights sets as described above. For instance, the decoding device 112 may perform any of the techniques described herein, including the processes described above with respect to FIGS. 16, 17, and 18.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set indicates that one member of the set or multiple members of the set satisfy the claim. For example, claim language reciting "at least one of A and B" means A, B, or A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method of processing media content, the method comprising:
    obtaining, at a current time instance, a current fragment comprising at least a current time component associated with one or more previous media samples of one or more previous fragments, wherein at least one previous fragment is an empty fragment without media sample data;
    determining, based on the current time component, a modified duration for at least one media sample forming part of the one or more previous media samples, the modified duration indicating a time duration by which the at least one media sample is to be extended or reduced in relation to the current time instance; and
    presenting the at least one media sample based on the modified duration.

2. The method of claim 1, wherein the modified duration includes an extension duration, the extension duration indicating the time duration by which the presentation of the previous media sample is to be extended in relation to the current time instance.

3. The method of claim 1, wherein the modified duration includes a reduction duration, the reduction duration indicating the time duration by which the presentation of the previous media sample is to be reduced in relation to the current time instance.

4. The method of claim 1, wherein presenting the at least one media sample comprises extending a duration of presentation of the previous media sample by at least an extension duration.

5. The method of claim 1, wherein presenting the at least one media sample comprises presenting a new media sample at the current time instance for at least an extension duration.

6. The method of claim 1, wherein presenting the at least one media sample comprises reducing a duration of presentation of the previous media sample by a reduction duration.

7. The method of claim 1, wherein the previous media sample is obtained at a previous time instance, the previous time instance preceding the current time instance.

8. The method of claim 1, further comprising:
obtaining an additional fragment comprising at least an additional time component associated with a media sample of an additional previous fragment, wherein the additional fragment comprises a redundant media sample, wherein the redundant media sample matches the media sample of the additional previous fragment.

9. The method of claim 8, wherein the additional fragment comprises a redundant media sample field, the redundant media sample field for providing an indication of the redundant media sample.

10. The method of claim 1, wherein presenting the at least one media sample comprises displaying video content of the at least one media sample.

11. The method of claim 1, wherein presenting the at least one media sample comprises presenting audio content of the at least one media sample.

12. The method of claim 1, wherein obtaining the current fragment comprises receiving and decoding the current fragment.

13. The method of claim 1, wherein the current fragment comprises a Track Fragment Decode Time Box (tfdt) box, the tfdt box comprising the current time component.

14. The method of claim 1, wherein the current time component comprises a baseMediaDecodeTime value.

15. The method of claim 1, wherein the previous fragment comprises a sample duration for presenting the previous media sample, and wherein the sample duration comprises a predetermined reasonable duration.

16. The method of claim 1, wherein the at least one media sample comprises sparse content, wherein a duration for presenting the sparse content is not known at a previous time instance when the previous fragment is decoded.

17. An apparatus for processing media content, the apparatus comprising:
a memory; and
a processor implemented in circuitry and configured to:
obtain, at a current time instance, a current fragment comprising at least a current time component associated with one or more previous media samples of one or more previous fragments, wherein at least one previous fragment is an empty fragment without media sample data;
determine, based on the current time component, a modified duration for at least one media sample forming part of the one or more previous media samples, the modified duration indicating a time duration by which the at least one media sample is to be extended or reduced in relation to the current time instance; and
present the at least one media sample based on the modified duration.

18. The apparatus of claim 17, wherein the modified duration includes an extension duration, the extension duration indicating the time duration by which the presentation of the previous media sample is to be extended in relation to the current time instance.

19. The apparatus of claim 17, wherein the modified duration includes a reduction duration, the reduction duration indicating the time duration by which the presentation of the previous media sample is to be reduced in relation to the current time instance.

20. The apparatus of claim 17, wherein, to present the at least one media sample, the processor is configured to extend a duration of presentation of the previous media sample by at least an extension duration.

21. The apparatus of claim 17, wherein, to present the at least one media sample, the processor is configured to present a new media sample at the current time instance for at least an extension duration.

22. The apparatus of claim 17, wherein, to present the at least one media sample, the processor is configured to reduce a duration of presentation of the previous media sample by a reduction duration.

23. The apparatus of claim 17, wherein the previous media sample is obtained at a previous time instance, the previous time instance preceding the current time instance.

24. The apparatus of claim 17, wherein the processor is configured to:
obtain an additional fragment comprising at least an additional time component associated with a media sample of an additional previous fragment, wherein the additional fragment comprises a redundant media sample, wherein the redundant media sample matches the media sample of the additional previous fragment.

25. The apparatus of claim 24, wherein the current fragment comprises a redundant media sample field, the redundant media sample field for providing an indication of the redundant media sample.

26. The apparatus of claim 17, wherein, to present the at least one media sample, the processor is configured to display video content of the at least one media sample.

27. The apparatus of claim 17, wherein, to present the at least one media sample, the processor is configured to present audio content of the at least one media sample.

28. The apparatus of claim 17, wherein, to obtain the current fragment, the processor is configured to receive and decode the current fragment.

29. The apparatus of claim 17, wherein the current fragment comprises a Track Fragment Decode Time Box (tfdt) box, the tfdt box comprising the current time component.

30. The apparatus of claim 17, wherein the current time component comprises a baseMediaDecodeTime value.

31. The apparatus of claim 17, wherein the previous fragment comprises a sample duration for presenting the previous media sample, and wherein the sample duration comprises a predetermined reasonable duration.

32. The apparatus of claim 17, wherein the at least one media sample comprises sparse content, wherein a duration for presenting the sparse content is not known at a previous time instance when the previous fragment is decoded.

33. The apparatus of claim 17, wherein the apparatus comprises a decoder.

34. The apparatus of claim 17, wherein the apparatus comprises a player device for presenting the media content.

35. A non-transitory computer-readable medium having stored thereon instructions that, when executed by one or more processors, cause the one or more processors to:
obtain, at a current time instance, a current fragment comprising at least a current time component associated with one or more previous media samples of one or more previous fragments, wherein at least one previous fragment is an empty fragment without media sample data;
determine, based on the current time component, a modified duration for at least one media sample forming part of the one or more previous media samples, the modified duration indicating a time duration by which the at least one media sample is to be extended or reduced in relation to the current time instance; and
present the at least one media sample based on the modified duration.

36. The non-transitory computer-readable medium of claim 35, wherein the modified duration includes an extension duration, the extension duration indicating the time duration by which the presentation of the previous media sample is to be extended in relation to the current time instance.

37. The non-transitory computer-readable medium of claim 35, wherein the modified duration includes a reduction duration, the reduction duration indicating the time duration by which the presentation of the previous media sample is to be reduced in relation to the current time instance.

38. The non-transitory computer-readable medium of claim 35, wherein presenting the at least one media sample comprises extending a duration of presentation of the previous media sample by at least an extension duration.

39. The non-transitory computer-readable medium of claim 35, wherein presenting the at least one media sample comprises presenting a new media sample at the current time instance for at least an extension duration.

40. The non-transitory computer-readable medium of claim 35, wherein presenting the at least one media sample comprises reducing a duration of presentation of the previous media sample by a reduction duration.

41. The non-transitory computer-readable medium of claim 35, wherein the previous media sample is obtained at a previous time instance, the previous time instance preceding the current time instance.

42. The non-transitory computer-readable medium of claim 35, further comprising instructions that, when executed by the one or more processors, cause the one or more processors to:
obtain an additional fragment comprising at least an additional time component associated with a media sample of an additional previous fragment, wherein the additional fragment comprises a redundant media sample, wherein the redundant media sample matches the media sample of the additional previous fragment.

43. The non-transitory computer-readable medium of claim 42, wherein the additional fragment comprises a redundant media sample field, the redundant media sample field for providing an indication of the redundant media sample.

44. The non-transitory computer-readable medium of claim 35, wherein presenting the at least one media sample comprises displaying video content of the at least one media sample.

45. The non-transitory computer-readable medium of claim 35, wherein presenting the at least one media sample comprises presenting audio content of the at least one media sample.

46. The non-transitory computer-readable medium of claim 35, wherein obtaining the current fragment comprises receiving and decoding the current fragment.

47. The non-transitory computer-readable medium of claim 35, wherein the current fragment comprises a Track Fragment Decode Time Box (tfdt) box, the tfdt box comprising the current time component.

48. The non-transitory computer-readable medium of claim 35, wherein the current time component comprises a baseMediaDecodeTime value.

49. The non-transitory computer-readable medium of claim 35, wherein the previous fragment comprises a sample duration for presenting the previous media sample, and wherein the sample duration comprises a predetermined reasonable duration.

50. The non-transitory computer-readable medium of claim 35, wherein the at least one media sample comprises sparse content, wherein a duration for presenting the sparse content is not known at a previous time instance when the previous fragment is decoded.

51. An apparatus for processing media content, the apparatus comprising:
means for obtaining, at a current time instance, a current fragment comprising at least a current time component associated with one or more previous media samples of one or more previous fragments, wherein at least one previous fragment is an empty fragment without media sample data;
means for determining, based on the current time component, a modified duration for at least one media sample forming part of the one or more previous media samples, the modified duration indicating a time duration by which the at least one media sample is to be extended or reduced in relation to the current time instance; and
means for presenting the at least one media sample based on the modified duration.

52. The apparatus of claim 51, wherein the modified duration includes an extension duration, the extension duration indicating the time duration by which the presentation of the previous media sample is to be extended in relation to the current time instance.

53. The apparatus of claim 51, wherein the modified duration includes a reduction duration, the reduction duration indicating the time duration by which the presentation of the previous media sample is to be reduced in relation to the current time instance.

54. The apparatus of claim 51, wherein the means for presenting the at least one media sample comprises means for extending a duration of presentation of the previous media sample by at least an extension duration.

55. The apparatus of claim 51, wherein the means for presenting the at least one media sample comprises means for presenting a new media sample at the current time instance for at least an extension duration.

56. The apparatus of claim 51, wherein the means for presenting the at least one media sample comprises means for reducing a duration of presentation of the previous media sample by a reduction duration.

57. The apparatus of claim 51, wherein the previous media sample is obtained at a previous time instance, the previous time instance preceding the current time instance.

58. The apparatus of claim 51, further comprising:
means for obtaining an additional fragment comprising at least an additional time component associated with a media sample of an additional previous fragment, wherein the additional fragment comprises a redundant media sample, wherein the redundant media sample matches the media sample of the additional previous fragment.

59. The apparatus of claim 58, wherein the additional fragment comprises a redundant media sample field, the redundant media sample field for providing an indication of the redundant media sample.

60. The apparatus of claim 51, wherein the means for presenting the at least one media sample comprises means for displaying video content of the at least one media sample.

61. The apparatus of claim 51, wherein the means for presenting the at least one media sample comprises means for presenting audio content of the at least one media sample.

62. The apparatus of claim 51, wherein the means for obtaining the current fragment comprises means for receiving the current fragment and means for decoding the current fragment.

63. The apparatus of claim 51, wherein the current fragment comprises a Track Fragment Decode Time Box (tfdt) box, the tfdt box comprising the current time component.

64. The apparatus of claim 51, wherein the current time component comprises a baseMediaDecodeTime value.

65. The apparatus of claim 51, wherein the previous fragment comprises a sample duration for presenting the previous media sample, and wherein the sample duration comprises a predetermined reasonable duration.

66. The apparatus of claim 51, wherein the at least one media sample comprises sparse content, wherein a duration for presenting the sparse content is not known at a previous time instance when the previous fragment is decoded.

67. A method of providing media content, the method comprising:
providing, at a previous time instance, a previous fragment comprising a previous media sample, wherein a duration for presenting the previous media sample is unknown at the previous time instance; and
providing, at a current time instance, a current fragment comprising at least a current time component associated with one or more previous media samples of one or more previous fragments, wherein at least one previous fragment is an empty fragment without media sample data, and wherein the current time component includes a modified duration for a previous media sample of a previous media fragment of the one or more previous fragments, the modified duration indicating a time duration by which a presentation of the previous media sample is to be extended or reduced in relation to the current time instance.

68. An apparatus for providing media content, the apparatus comprising:
a memory; and
a processor implemented in circuitry and configured to:
provide, at a previous time instance, a previous fragment comprising a previous media sample, wherein a duration for presenting the previous media sample is unknown at the previous time instance; and
provide, at a current time instance, a current fragment comprising at least a current time component associated with one or more previous media samples of one or more previous fragments, wherein at least one previous fragment is an empty fragment without media sample data, and wherein the current time component includes a modified duration for a previous media sample of a previous media fragment of the one or more previous fragments, the modified duration indicating a time duration by which a presentation of the previous media sample is to be extended or reduced in relation to the current time instance.

69. A non-transitory computer-readable medium having stored thereon instructions that, when executed by one or more processors, cause the one or more processors to:
provide, at a previous time instance, a previous fragment comprising a previous media sample, wherein a duration for presenting the previous media sample is unknown at the previous time instance; and
provide, at a current time instance, a current fragment comprising at least a current time component associated with one or more previous media samples of one or more previous fragments, wherein at least one previous fragment is an empty fragment without media sample data, and wherein the current time component includes a modified duration for a previous media sample of a previous media fragment of the one or more previous fragments, the modified duration indicating a time duration by which a presentation of the previous media sample is to be extended or reduced in relation to the current time instance.

70. An apparatus for providing media content, the apparatus comprising:
means for providing, at a previous time instance, a previous fragment comprising a previous media sample, wherein a duration for presenting the previous media sample is unknown at the previous time instance; and
means for providing, at a current time instance, a current fragment comprising at least a current time component associated with one or more previous media samples of one or more previous fragments, wherein at least one previous fragment is an empty fragment without media sample data, and wherein the current time component includes a modified duration for a previous media sample of a previous media fragment of the one or more previous fragments, the modified duration indicating a time duration by which a presentation of the previous media sample is to be extended or reduced in relation to the current time instance.

* * * * *